United States Patent
Hirzallah et al.

(10) Patent No.: US 12,382,308 B2
(45) Date of Patent: Aug. 5, 2025

(54) MULTI-ANCHOR SIDELINK QUASI-COLOCATION INDICATION AND CONFIGURATION FOR ENHANCED POSITIONING AND SENSING

(71) Applicant: QUALCOMM Incorporated, San Diego, CA (US)

(72) Inventors: Mohammed Ali Mohammed Hirzallah, San Diego, CA (US); Marwen Zorgui, San Diego, CA (US); Srinivas Yerramalli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 545 days.

(21) Appl. No.: 17/806,723

(22) Filed: Jun. 13, 2022

(65) Prior Publication Data

US 2023/0403569 A1    Dec. 14, 2023

(51) Int. Cl.
*H04W 16/28*    (2009.01)
*H04L 5/00*    (2006.01)
*H04W 92/18*    (2009.01)

(52) U.S. Cl.
CPC ........... *H04W 16/28* (2013.01); *H04L 5/0051* (2013.01); *H04W 92/18* (2013.01)

(58) Field of Classification Search
CPC ..... H04W 16/28; H04W 92/18; H04W 64/00; H04L 5/0051
See application file for complete search history.

(56) References Cited

U.S. PATENT DOCUMENTS

| | | | | |
|---|---|---|---|---|
| 10,951,376 | B2 * | 3/2021 | John Wilson | H04L 5/0053 |
| 12,113,591 | B2 * | 10/2024 | Kakishima | H04B 7/088 |
| 2018/0234912 | A1 * | 8/2018 | Islam | H04W 48/10 |
| 2019/0393946 | A1 * | 12/2019 | Guo | H04B 7/0695 |
| 2020/0314673 | A1 * | 10/2020 | Deogun | H04B 7/024 |
| 2020/0336253 | A1 * | 10/2020 | He | H04W 76/11 |
| 2020/0413374 | A1 | 12/2020 | Luo et al. | |
| 2020/0413391 | A1 * | 12/2020 | Luo | H04W 72/046 |
| 2021/0076395 | A1 * | 3/2021 | Zhou | H04L 27/26025 |
| 2021/0099832 | A1 * | 4/2021 | Duan | H04W 24/10 |

(Continued)

OTHER PUBLICATIONS

International Search Report and Written Opinion—PCT/US2023/020908—ISA/EPO—Aug. 18, 2023.

*Primary Examiner* — Sujoy K Kundu
*Assistant Examiner* — Vladislav Y Agureyev
(74) *Attorney, Agent, or Firm* — Weaver Austin Villeneuve & Sampson LLP/QUALCOMM

(57) ABSTRACT

In some implementations, a base device may determine a quali-colocation (QCL) relation between a first wireless reference signal transmitted by a first sidelink (SL) anchor and a second wireless reference signal transmitted by a second SL anchor, wherein: the first SL anchor and the second SL anchor comprise UEs separate from the receiving UE, and the first wireless reference signal and the second wireless reference signal are transmitted for positioning of the receiving UE, performing radio frequency (RF) sensing, or both. The base device may wirelessly send, from the base device to the receiving UE, the mSL-QCL information, wherein the mSL-QCL information is indicative of the QCL relation between the first wireless reference signal and the second wireless reference signal.

30 Claims, 10 Drawing Sheets

(56) References Cited

U.S. PATENT DOCUMENTS

| | | | |
|---|---|---|---|
| 2021/0105118 A1* | 4/2021 | Wu | H04W 72/20 |
| 2021/0136532 A1* | 5/2021 | Liu | H04W 4/06 |
| 2021/0204252 A1 | 7/2021 | Akkarakaran et al. | |
| 2021/0360603 A1 | 11/2021 | Wang et al. | |
| 2022/0131725 A1* | 4/2022 | Li | H04W 74/0816 |
| 2022/0217690 A1* | 7/2022 | Liu | H04W 76/14 |
| 2022/0330038 A1* | 10/2022 | Ganesan | H04W 52/383 |
| 2022/0399927 A1* | 12/2022 | Tsai | H04B 7/0617 |
| 2023/0224866 A1* | 7/2023 | Hakola | H04W 72/02 |
| | | | 370/329 |
| 2023/0273283 A1* | 8/2023 | Kurras | G01S 1/024 |
| | | | 455/456.1 |
| 2023/0296752 A1* | 9/2023 | Thomas | H04L 5/0048 |
| | | | 342/125 |
| 2023/0299898 A1* | 9/2023 | Zhang | H04L 5/0005 |
| 2024/0146473 A1* | 5/2024 | Li | H04L 5/0044 |
| 2024/0172224 A1* | 5/2024 | Xiong | H04W 72/21 |
| 2024/0214109 A1* | 6/2024 | Zhang | H04L 1/0004 |

\* cited by examiner

MULTI-ANCHOR SIDELINK QUASI-COLOCATION INDICATION AND CONFIGURATION FOR ENHANCED POSITIONING AND SENSING

BACKGROUND

1. Field of Disclosure

The present disclosure relates generally to the field of wireless communications, and more specifically to determining the location of a User Equipment (UE) using radio frequency (RF) signals.

2. Description of Related Art

In a wireless communication network, such as a mobile/cellular broadband network, a receiving UE may be utilized to receive RF signals for positioning of the receiving UE and/or performing RF sensing of nearby objects. In some embodiments, these RF signals, or "reference signals," may be sent from other UEs using sidelink (SL) communications. When performing measurements of these reference signals, the receiving UE take into account signal properties such as delay, delay spread, Doppler shift, and Doppler spread.

BRIEF SUMMARY

An example method of configuring a receiving user equipment (UE) for multi-anchor sidelink quasi-colocation (mSL-QCL) information, according to this disclosure, may comprise determining, at a base device, a quali-colocation (QCL) relation between a first wireless reference signal transmitted by a first sidelink (SL) anchor and a second wireless reference signal transmitted by a second SL anchor, wherein the first SL anchor and the second SL anchor comprise UEs separate from the receiving UE, and the first wireless reference signal and the second wireless reference signal are transmitted for positioning of the receiving UE, performing radio frequency (RF) sensing, or both. The method also may comprise wirelessly sending, from the base device to the receiving UE, the mSL-QCL information, wherein the mSL-QCL information is indicative of the QCL relation between the first wireless reference signal and the second wireless reference signal.

An example method at a receiving user equipment (UE) for utilizing multi-anchor sidelink quasi-colocation (mSL-QCL) information, according to this disclosure, may comprise wirelessly receiving, at the receiving UE, the mSL-QCL information from a base device, wherein the mSL-QCL information is indicative of a quali-colocation (QCL) relationship between a first wireless reference signal transmitted by a first sidelink (SL) anchor and a second wireless reference signal transmitted by a second SL anchor, and wherein the first SL anchor and the second SL anchor comprise UEs separate from the receiving UE, and the first wireless reference signal and the second wireless reference signal are transmitted for positioning of the receiving UE, performing radio frequency (RF) sensing, or both. The method also may comprise wirelessly measuring the first wireless reference signal, the second wireless reference signal, or both, based at least in part on the mSL-QCL information.

An example base device for configuring a receiving user equipment (UE) for multi-anchor sidelink quasi-colocation (mSL-QCL) information, according to this disclosure, may comprise a transceiver, a memory, one or more processors communicatively coupled with the transceiver and the memory, wherein the one or more processors are configured to determine a quali-colocation (QCL) relation between a first wireless reference signal transmitted by a first sidelink (SL) anchor and a second wireless reference signal transmitted by a second SL anchor, wherein: the first SL anchor and the second SL anchor comprise UEs separate from the receiving UE, and the first wireless reference signal and the second wireless reference signal are transmitted for positioning of the receiving UE, performing radio frequency (RF) sensing, or both. The one or more processors further may be configured to wirelessly send, via the transceiver to the receiving UE, the mSL-QCL information, wherein the mSL-QCL information is indicative of the QCL relation between the first wireless reference signal and the second wireless reference signal.

An example receiving user equipment (UE) for utilizing multi-anchor sidelink quasi-colocation (mSL-QCL) information, according to this disclosure, may comprise a transceiver, a memory, one or more processors communicatively coupled with the transceiver and the memory, wherein the one or more processors are configured to wirelessly receive, via the transceiver, the mSL-QCL information from a base device, wherein the mSL-QCL information is indicative of a quali-colocation (QCL) relationship between a first wireless reference signal transmitted by a first sidelink (SL) anchor and a second wireless reference signal transmitted by a second SL anchor, and wherein: the first SL anchor and the second SL anchor comprise UEs separate from the receiving UE, and the first wireless reference signal and the second wireless reference signal are transmitted for positioning of the receiving UE, performing radio frequency (RF) sensing, or both. The one or more processors further may be configured to wirelessly measure, with the transceiver, the first wireless reference signal, the second wireless reference signal, or both, based at least in part on the mSL-QCL information.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

Figure 1:
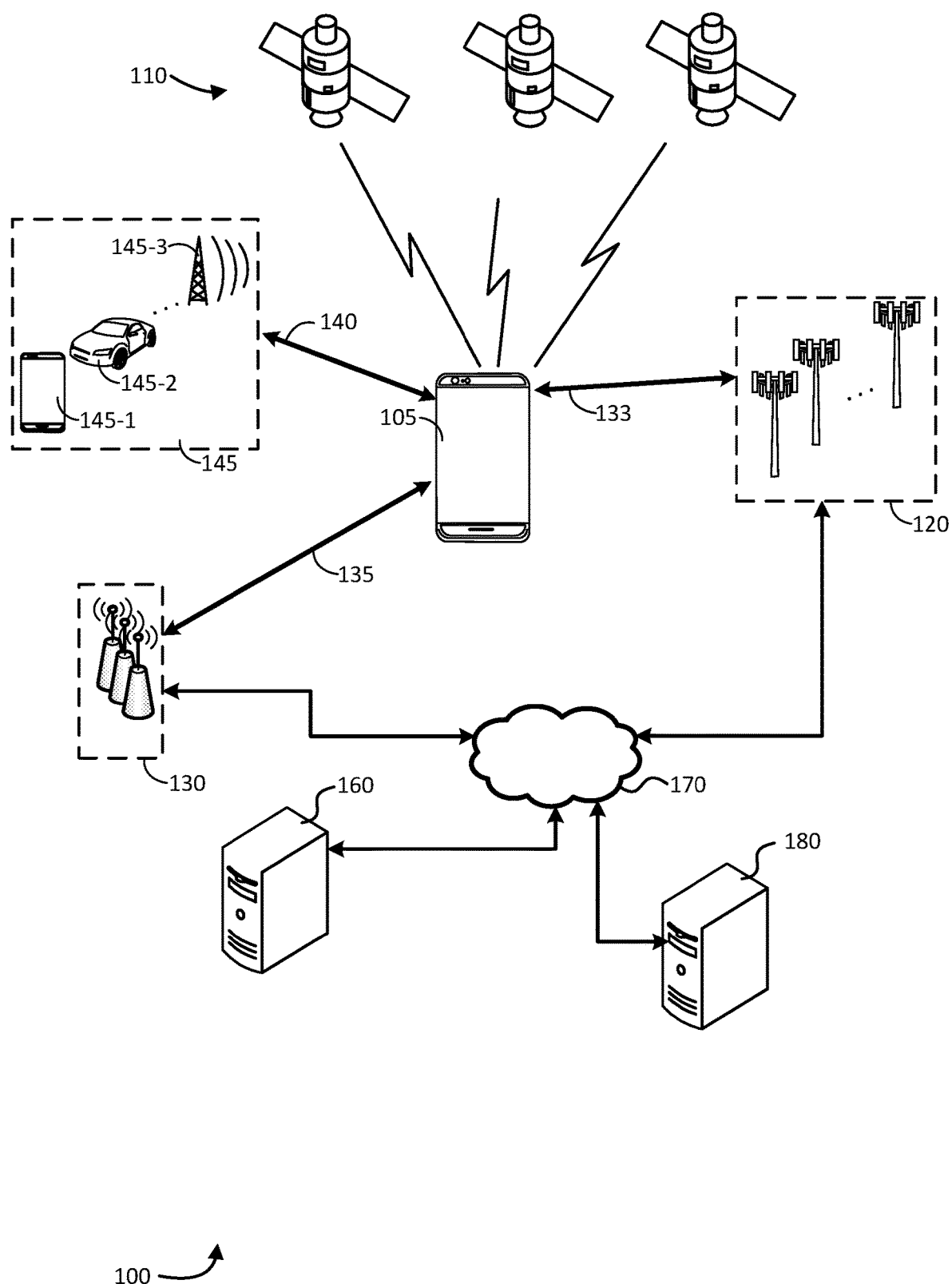
FIG. 1 is a diagram of a positioning system, according to an embodiment.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

The following description is directed to certain implementations for the purposes of describing innovative aspects of various embodiments. However, a person having ordinary skill in the art will readily recognize that the teachings herein can be applied in a multitude of different ways. The described implementations may be implemented in any device, system, or network that is capable of transmitting and receiving radio frequency (RF) signals according to any communication standard, such as any of the Institute of Electrical and Electronics Engineers (IEEE) 802.15.4 standards for ultra-wideband (UWB), IEEE 802.11 standards (including those identified as Wi-Fi® technologies), the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Rate Packet Data (HRPD), High Speed Packet Access (HSPA), High Speed Downlink Packet Access (HSDPA), High Speed Uplink Packet Access (HSUPA), Evolved High Speed Packet Access (HSPA+), Long Term Evolution (LTE), Advanced Mobile Phone System (AMPS), or other known signals that are used to communicate within a wireless, cellular or internet of things (IoT) network, such as a system utilizing 3G, 4G, 5G, 6G, or further implementations thereof, technology.

As used herein, an "RF signal" comprises an electromagnetic wave that transports information through the space between a transmitter (or transmitting device) and a receiver (or receiving device). As used herein, a transmitter may transmit a single "RF signal" or multiple "RF signals" to a receiver. However, the receiver may receive multiple "RF signals" corresponding to each transmitted RF signal due to the propagation characteristics of RF signals through multiple channels or paths.

Additionally, unless otherwise specified, references to "reference signals," "positioning reference signals," "reference signals for positioning," and the like may be used to refer to signals used for positioning of a user equipment (UE) in a 5G new radio (NR) network. As described in more detail herein, such signals may comprise any of a variety of signal types but may not necessarily be limited to a Positioning Reference Signal (PRS) as defined in relevant wireless standards.

Further, unless otherwise specified, the term "positioning" as used herein may include absolute location determination, relative location determination, ranging, or a combination thereof. Such positioning may include and/or be based on timing, angular, phase, or power measurements, or a combination thereof (which may include RF sensing measurements) for the purpose of location or sensing services.

As noted, a receiving UE may be utilized to receive RF signals for positioning of the receiving UE and/or performing RF sensing of nearby objects. Measurements of the RF reference signals may take into account signal properties such as delay, delay spread, Doppler shift, and Doppler spread. For efficiency, this information can be conveyed to a UE using another signal as a Quasi Colocation (QCL) reference for the RF reference signal. According to embodiments herein, in a multi-anchor sidelink (SL) positioning scenario, a base device (e.g., a base station or base SL anchor) can provide QCL information, indicating a signal from a first SL anchor that may act as a QCL reference for a signal from a second SL anchor. This QCL information can be leveraged by the receiving UE to obtain measurements for positioning and/or RF sensing purposes. A thorough discussion of such embodiments will be provided after a review of relevant technologies.

FIG. 1 is a simplified illustration of a positioning system 100 in which a mobile device 105, location server 160, and/or other components of the positioning system 100 can use the techniques provided herein for determining an estimated location of mobile device 105 using a multi-anchor SL QCL (mSL-QCL) indication and configuration for, according to an embodiment. The techniques described herein may be implemented by one or more components of the positioning system 100. The positioning system 100 can include: a mobile device 105; one or more satellites 110 (also referred to as space vehicles (SVs)) for a Global Navigation Satellite System (GNSS) such as the Global Positioning System (GPS), GLONASS, Galileo or Beidou; base stations 120; access points (APs) 130; location server 160; network 170; and external client 180. Generally put, the positioning system 100 can estimate a location of the mobile device 105 based on RF signals received by and/or sent from the mobile device 105 and known locations of other components (e.g., GNSS satellites 110, base stations 120, APs 130) transmitting and/or receiving the RF signals. Additional details regarding particular location estimation techniques are discussed hereafter.

It should be noted that FIG. 1 provides only a generalized illustration of various components, any or all of which may be utilized as appropriate, and each of which may be duplicated as necessary. Specifically, although only one mobile device 105 is illustrated, it will be understood that many mobile devices (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to location server 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a wireless local area network (WLAN), a wireless wide-area network (WWAN), and/or the Internet, for example. Examples of network 170 include a Long-Term Evolution (LTE) wireless network, a Fifth Generation (5G) wireless network (also referred to as New Radio (NR) wireless network or 5G NR wireless network), a Wi-Fi WLAN, and the Internet. LTE, 5G and NR are wireless technologies defined, or being defined, by the 3rd Generation Partnership Project (3GPP). Network 170 may also include more than one network and/or more than one type of network. In a wireless cellular network (e.g., LTE or 5G), the mobile device 105 may be referred to as a user equipment (UE)

The base stations 120 and access points (APs) 130 may be communicatively coupled to the network 170. In some embodiments, the base station 120s may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. The functionality performed by a base station 120 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. An AP 130 may comprise a Wi-Fi AP or a Bluetooth® AP or an AP having cellular capabilities (e.g., 4G LTE and/or 5G NR), for example. Thus, mobile device 105 can send and receive information with network-connected devices, such as location server 160, by accessing the network 170 via a base station 120 using a first communication link 133. Additionally or alternatively, because APs 130 also may be communicatively coupled with the network 170, mobile device 105 may communicate with network-connected and Internet-connected devices, including location server 160, using a second communication link 135, or via one or more other mobile devices 145.

As used herein, the term "base station" may generically refer to a single physical transmission point, or multiple co-located physical transmission points, which may be located at a base station 120. A Transmission Reception Point (TRP) (also known as transmit/receive point) corresponds to this type of transmission point, and the term "TRP" may be used interchangeably herein with the terms "gNB," "ng-eNB," and "base station." In some cases, a base station 120 may comprise multiple TRPs—e.g. with each TRP associated with a different antenna or a different antenna array for the base station 120. As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP. Physical transmission points may comprise an array of antennas of a base station 120 (e.g., as in a Multiple Input-Multiple Output (MIMO) system and/or where the base station employs beamforming). The term "base station" may additionally refer to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station).

As used herein, the term "cell" may generically refer to a logical communication entity used for communication with a base station 120, and may be associated with an identifier for distinguishing neighboring cells (e.g., a Physical Cell Identifier (PCID), a Virtual Cell Identifier (VCID)) operating via the same or a different carrier. In some examples, a carrier may support multiple cells, and different cells may be configured according to different protocol types (e.g., Machine-Type Communication (MTC), Narrowband Internet-of-Things (NB-IoT), Enhanced Mobile Broadband (eMBB), or others) that may provide access for different types of devices. In some cases, the term "cell" may refer to a portion of a geographic coverage area (e.g., a sector) over which the logical entity operates.

Satellites 110 may be utilized for positioning of the mobile device 105 in one or more ways. For example, satellites 110 (also referred to as space vehicles (SVs)) may be part of a Global Navigation Satellite System (GNSS) such as the Global Positioning System (GPS), GLONASS, Galileo or Beidou. Positioning using RF signals from GNSS satellites may comprise measuring multiple GNSS signals at a GNSS receiver of the mobile device 105 to perform code-based and/or carrier-based positioning, which can be highly accurate. Additionally or alternatively, satellites 110 may be utilized for Non-Terrestrial Network (NTN)-based positioning, in which satellites 110 may functionally operate as TRPs (or TPs) of a network (e.g., LTE and/or NR network) and may be communicatively coupled with network 170. In particular, reference signals (e.g., PRS) transmitted by satellites 110 NTN-based positioning may be similar to those transmitted by base stations 120, and may be coordinated by a location server 160. In some embodiments, satellites 110 used for NTN-based positioning may be different than those used for GNSS-based positioning.

The location server 160 may comprise a server and/or other computing device configured to determine an estimated location of mobile device 105 and/or provide data (e.g., "assistance data") to mobile device 105 to facilitate location measurement and/or location determination by mobile device 105. According to some embodiments, location server 160 may comprise a Home Secure User Plane Location (SUPL) Location Platform (H-SLP), which may support the SUPL user plane (UP) location solution defined by the Open Mobile Alliance (OMA) and may support location services for mobile device 105 based on subscription information for mobile device 105 stored in location server 160. In some embodiments, the location server 160 may comprise, a Discovered SLP (D-SLP) or an Emergency SLP (E-SLP). The location server 160 may also comprise an Enhanced Serving Mobile Location Center (E-SMLC) that supports location of mobile device 105 using a control plane (CP) location solution for LTE radio access by mobile device 105. The location server 160 may further comprise a Location Management Function (LMF) that supports location of mobile device 105 using a control plane (CP) location solution for NR or LTE radio access by mobile device 105.

In a CP location solution, signaling to control and manage the location of mobile device 105 may be exchanged between elements of network 170 and with mobile device 105 using existing network interfaces and protocols and as signaling from the perspective of network 170. In a UP location solution, signaling to control and manage the location of mobile device 105 may be exchanged between location server 160 and mobile device 105 as data (e.g. data transported using the Internet Protocol (IP) and/or Transmission Control Protocol (TCP)) from the perspective of network 170.

As previously noted (and discussed in more detail below), the estimated location of mobile device 105 may be based on measurements of RF signals sent from and/or received by the mobile device 105. In particular, these measurements can provide information regarding the relative distance and/or angle of the mobile device 105 from one or more components in the positioning system 100 (e.g., GNSS satellites 110, APs 130, base stations 120). The estimated location of the mobile device 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the mobile device 105 may be estimated at least in part based on measurements of RF signals 140 communicated between the mobile device 105 and one or more other mobile devices 145, which may be mobile or fixed. As illustrated, other mobile devices may include, for example, a mobile phone 145-1, vehicle 145-2, static communication/positioning device 145-3, or other static and/or mobile device capable of providing wireless signals used for positioning the mobile device 105, or a combination thereof. Wireless signals from mobile devices 145 used for positioning of the mobile device 105 may comprise RF signals using, for example, Bluetooth® (including Bluetooth Low Energy (BLE)), IEEE 802.11x (e.g., Wi-Fi®), Ultra Wideband (UWB), IEEE 802.15x, or a combination thereof. Mobile devices 145 may additionally or alternatively use non-RF wireless signals for positioning of the mobile device 105, such as infrared signals or other optical technologies.

Mobile devices 145 may comprise other mobile devices communicatively coupled with a cellular or other mobile network (e.g., network 170). When one or more other mobile devices 145 are used in the position determination of a particular mobile device 105, the mobile device 105 for which the position is to be determined may be referred to as the "target mobile device," and each of the other mobile devices 145 used may be referred to as an "anchor mobile device." (In a cellular/mobile broadband network, the terms "anchor UE" and "target UE" may be used.) For position determination of a target mobile device, the respective positions of the one or more anchor mobile devices may be known and/or jointly determined with the target mobile device. Direct communication between the one or more other mobile devices 145 and mobile device 105 may comprise sidelink and/or similar Device-to-Device (D2D) communication technologies. Sidelink, which is defined by 3GPP, is a form of D2D communication under the cellular-based LTE and NR standards. UWB may be one such technology by which the positioning of a target device (e.g., mobile device 105) may be facilitated using measurements from one or more anchor devices (e.g., mobile devices 145).

According to some embodiments, such as when the mobile device 105 comprises and/or is incorporated into a vehicle, a form of D2D communication used by the mobile device 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The mobile device 105 illustrated in FIG. 1 may correspond to a component or device on a vehicle, RSU, or other V2X entity that is used to communicate V2X messages. In embodiments in which V2X is used, the static communication/positioning device 145-3 (which may correspond with an RSU) and/or the vehicle 145-2, therefore, may communicate with the mobile device 105 and may be used to determine the position of the mobile device 105 using techniques similar to those used by base stations 120 and/or APs 130 (e.g., using multiangulation and/or multilateration). It can be further noted that mobile devices 145 (which may include V2X devices), base stations 120, and/or APs 130 may be used together (e.g., in a WWAN positioning solution) to determine the position of the mobile device 105, according to some embodiments.

An estimated location of mobile device 105 can be used in a variety of applications—e.g. to assist direction finding or navigation for a user of mobile device 105 or to assist another user (e.g. associated with external client 180) to locate mobile device 105. A "location" is also referred to herein as a "location estimate", "estimated location", "location", "position", "position estimate", "position fix", "estimated position", "location fix" or "fix". The process of determining a location may be referred to as "positioning," "position determination," "location determination," or the like. A location of mobile device 105 may comprise an absolute location of mobile device 105 (e.g. a latitude and longitude and possibly altitude) or a relative location of mobile device 105 (e.g. a location expressed as distances north or south, east or west and possibly above or below some other known fixed location (including, e.g., the location of a base station 120 or AP 130) or some other location such as a location for mobile device 105 at some known previous time, or a location of a mobile device 145 (e.g., another mobile device) at some known previous time). A location may be specified as a geodetic location comprising coordinates which may be absolute (e.g. latitude, longitude and optionally altitude), relative (e.g. relative to some known absolute location) or local (e.g. X, Y and optionally Z coordinates according to a coordinate system defined relative to a local area such a factory, warehouse, college campus, shopping mall, sports stadium, or convention center). A location may instead be a civic location and may then comprise one or more of a street address (e.g. including names or labels for a country, state, county, city, road and/or street, and/or a road or street number), and/or a label or name for a place, building, portion of a building, floor of a building, and/or room inside a building etc. A location may further include an uncertainty or error indication, such as a horizontal and possibly vertical distance by which the location is expected to be in error or an indication of an area or volume (e.g. a circle or ellipse) within which mobile device 105 is expected to be located with some level of confidence (e.g. 95% confidence).

The external client 180 may be a web server or remote application that may have some association with mobile device 105 (e.g. may be accessed by a user of mobile device 105) or may be a server, application, or computer system providing a location service to some other user or users which may include obtaining and providing the location of mobile device 105 (e.g. to enable a service such as friend or relative finder, or child or pet location). Additionally or alternatively, the external client 180 may obtain and provide the location of mobile device 105 to an emergency services provider, government agency, etc.

Figure 2:
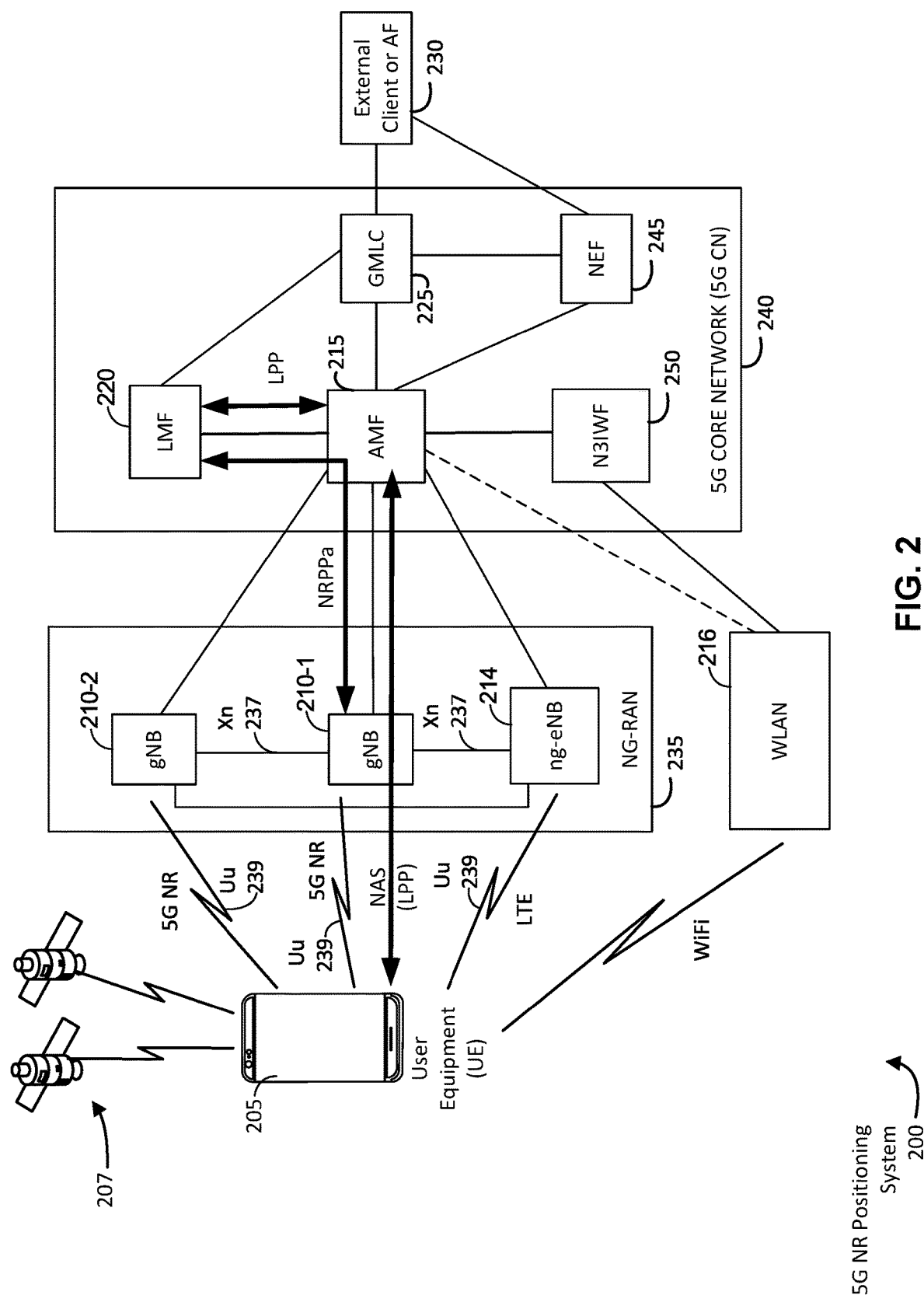
FIG. 2 is a diagram of a 5th Generation (5G) New Radio (NR) positioning system, illustrating an embodiment of a positioning system (e.g., the positioning system of FIG. 1) implemented within a 5G NR communication system.

FIG. 2 shows a diagram of a 5G NR positioning system 200, illustrating an embodiment of a positioning system (which may correspond to at least a portion of positioning system 100 of FIG. 1) implementing 5G NR. The 5G NR positioning system 200 may be configured to determine the location of a user equipment (UE) 205 by using access nodes, which may include NR NodeB (gNB) 210-1 and 210-2 (collectively and generically referred to herein as gNBs 210), ng-eNB 214, and/or WLAN 216 to implement one or more positioning methods. (The UE 205 of FIG. 2 may correspond to the mobile device 105 of FIG. 1.) The gNBs 210 and/or the ng-eNB 214 may correspond with base stations described elsewhere herein, and the WLAN 216 may correspond with one or more access points described elsewhere herein. Optionally, the 5G NR positioning system 200 additionally may be configured to determine the location of a UE 205 by using an LMF 220 (which may correspond with a location server as described elsewhere herein) to implement the one or more positioning methods. Here, the 5G NR positioning system 200 comprises a UE 205, and components of a 5G NR network comprising a Next Generation (NG) Radio Access Network (RAN) (NG-RAN) 235 and a 5G Core Network (5G CN) 240. A 5G network may also be referred to as an NR network; NG-RAN 235 may be referred to as a 5G RAN or as an NR RAN; and 5G CN 240 may be referred to as an NG Core network.

The 5G NR positioning system 200 may further utilize information from satellites 207. As previously indicated, satellites 207 may comprise GNSS satellites from a GNSS system like Global Positioning System (GPS) or similar system (e.g. GLONASS, Galileo, Beidou, Indian Regional Navigational Satellite System (IRNSS)). Additionally or alternatively, satellites 207 may comprise NTN satellites that may be communicatively coupled with the LMF 220 and may operatively function as a TRP (or TP) in the NG-RAN 235. As such, satellites 207 may be in communication with one or more gNB 210.

It should be noted that FIG. 2 provides only a generalized illustration of various components, any or all of which may be utilized as appropriate, and each of which may be duplicated or omitted as necessary. Specifically, although only one UE 205 is illustrated, it will be understood that many UEs (e.g., hundreds, thousands, millions, etc.) may utilize the 5G NR positioning system 200. Similarly, the 5G NR positioning system 200 may include a larger (or smaller) number of GNSS satellites 207, gNBs 210, ng-eNBs 214, Wireless Local Area Networks (WLANs) 216, Access and mobility Management Functions (AMF)s 215, external clients 230, and/or other components. The illustrated connections that connect the various components in the 5G NR positioning system 200 include data and signaling connections which may include additional (intermediary) components, direct or indirect physical and/or wireless connections, and/or additional networks. Furthermore, components may be rearranged, combined, separated, substituted, and/or omitted, depending on desired functionality.

The UE 205 may comprise and/or be referred to as a device, a mobile device, a wireless device, a mobile terminal, a terminal, a mobile station (MS), a Secure User Plane Location (SUPL)-Enabled Terminal (SET), or by some other name. Moreover, UE 205 may correspond to a cellphone, smartphone, laptop, tablet, personal data assistant (PDA), navigation device, Internet of Things (IoT) device, or some other portable or moveable device. Typically, though not necessarily, the UE 205 may support wireless communication using one or more Radio Access Technologies (RATs) such as using GSM, CDMA, W-CDMA, LTE, High Rate Packet Data (HRPD), IEEE 802.11 Wi-Fi®, Bluetooth, Worldwide Interoperability for Microwave Access (WiMAX™), 5G NR (e.g., using the NG-RAN 235 and 5G CN 240), etc. The UE 205 may also support wireless communication using a WLAN 216 which (like one or more RATs as described elsewhere herein) may connect to other networks, such as the Internet. The use of one or more of these RATs may allow the UE 205 to communicate with an external client 230 (e.g., via elements of 5G CN 240 not shown in FIG. 2, or possibly via a Gateway Mobile Location Center (GMLC) 225) and/or allow the external client 230 to receive location information regarding the UE 205 (e.g., via the GMLC 225). The external client 230 of FIG. 2 may correspond to an external client as implemented in or communicatively coupled with a NR network.

The UE 205 may include a single entity or may include multiple entities, such as in a personal area network where a user may employ audio, video and/or data I/O devices, and/or body sensors and a separate wireline or wireless modem. An estimate of a location of the UE 205 may be referred to as a location, location estimate, location fix, fix, position, position estimate, or position fix, and may be geodetic, thus providing location coordinates for the UE 205 (e.g., latitude and longitude), which may or may not include an altitude component (e.g., height above sea level, height above or depth below ground level, floor level or basement level). Alternatively, a location of the UE 205 may be expressed as a civic location (e.g., as a postal address or the designation of some point or small area in a building such as a particular room or floor). A location of the UE 205 may also be expressed as an area or volume (defined either geodetically or in civic form) within which the UE 205 is expected to be located with some probability or confidence level (e.g., 67%, 95%, etc.). A location of the UE 205 may further be a relative location comprising, for example, a distance and direction or relative X, Y (and Z) coordinates defined relative to some origin at a known location which may be defined geodetically, in civic terms, or by reference to a point, area, or volume indicated on a map, floor plan or building plan. In the description contained herein, the use of the term location may comprise any of these variants unless indicated otherwise. When computing the location of a UE, it is common to solve for local X, Y, and possibly Z coordinates and then, if needed, convert the local coordinates into absolute ones (e.g. for latitude, longitude and altitude above or below mean sea level).

Base stations in the NG-RAN 235 shown in FIG. 2 may correspond to base stations as described elsewhere herein and may include gNBs 210. Pairs of gNBs 210 in NG-RAN 235 may be connected to one another (e.g., directly as shown in FIG. 2 or indirectly via other gNBs 210). The communication interface between base stations (gNBs 210 and/or ng-eNB 214) may be referred to as an Xn interface 237. Access to the network is provided to UE 205 via wireless communication between the UE 205 and one or more of the gNBs 210, which may provide wireless communications access to the CN 240 on behalf of the UE 205 using 5G NR. The wireless interface between base stations (gNBs 210 and/or ng-eNB 214) and the UE 205 may be referred to as a Uu interface 239. 5G NR radio access may also be referred to as NR radio access or as 5G radio access. In FIG. 2, the serving gNB for UE 205 is assumed to be gNB 210-1, although other gNBs (e.g. gNB 210-2) may act as a serving gNB if UE 205 moves to another location or may act as a secondary gNB to provide additional throughput and bandwidth to UE 205.

Base stations in the NG-RAN 235 shown in FIG. 2 may also or instead include a next generation evolved Node B, also referred to as an ng-eNB, 214. Ng-eNB 214 may be connected to one or more gNBs 210 in NG-RAN 235—e.g. directly or indirectly via other gNBs 210 and/or other ng-eNBs. An ng-eNB 214 may provide LTE wireless access and/or evolved LTE (eLTE) wireless access to UE 205. Some gNBs 210 (e.g. gNB 210-2) and/or ng-eNB 214 in FIG. 2 may be configured to function as positioning-only beacons which may transmit signals (e.g., Positioning Reference Signal (PRS)) and/or may broadcast assistance data to assist positioning of UE 205 but may not receive signals from UE 205 or from other UEs. Some gNBs 210 (e.g., gNB 210-2 and/or another gNB not shown) and/or ng-eNB 214 may be configured to function as detecting-only nodes may scan for signals containing, e.g., PRS data, assistance data, or other location data. Such detecting-only nodes may not transmit signals or data to UEs but may transmit signals or data (relating to, e.g., PRS, assistance data, or other location data) to other network entities (e.g., one or more components of 5G CN 240, external client 230, or a controller) which may receive and store or use the data for positioning of at least UE 205. It is noted that while only one ng-eNB 214 is shown in FIG. 2, some embodiments may include multiple ng-eNBs 214. Base stations (e.g., gNBs 210 and/or ng-eNB 214) may communicate directly with one another via an Xn communication interface. Additionally or alternatively, base stations may communicate directly or indirectly with other components of the 5G NR positioning system 200, such as the LMF 220 and AMF 215.

5G NR positioning system 200 may also include one or more WLANs 216 which may connect to a Non-3GPP InterWorking Function (N3IWF) 250 in the 5G CN 240 (e.g., in the case of an untrusted WLAN 216). For example, the WLAN 216 may support IEEE 802.11 Wi-Fi access for UE 205 and may comprise one or more Wi-Fi APs (e.g., access points, as described elsewhere herein). Here, the N3IWF 250 may connect to other elements in the 5G CN 240 such as AMF 215. In some embodiments, WLAN 216 may support another RAT such as Bluetooth. The N3IWF 250 may provide support for secure access by UE 205 to other elements in 5G CN 240 and/or may support interworking of one or more protocols used by WLAN 216 and UE 205 to one or more protocols used by other elements of 5G CN 240 such as AMF 215. For example, N3IWF 250 may support IPSec tunnel establishment with UE 205, termination of IKEv2/IPSec protocols with UE 205, termination of N2 and N3 interfaces to 5G CN 240 for control plane and user plane, respectively, relaying of uplink (UL) and downlink (DL) control plane Non-Access Stratum (NAS) signaling between UE 205 and AMF 215 across an N1 interface. In some other embodiments, WLAN 216 may connect directly to elements in CN 240 (e.g. AMF 215 as shown by the dashed line in FIG. 2) and not via N3IWF 250. For example, direct connection of WLAN 216 to 5GCN 240 may occur if WLAN 216 is a trusted WLAN for 5GCN 240 and may be enabled using a Trusted WLAN Interworking Function (TWIF) (not shown in FIG. 2) which may be an element inside WLAN 216. It is noted that while only one WLAN 216 is shown in FIG. 2, some embodiments may include multiple WLANs 216.

Access nodes may comprise any of a variety of network entities enabling communication between the UE 205 and the AMF 215. As noted, this can include gNBs 210, ng-eNB 214, WLAN 216, and/or other types of cellular base stations. However, access nodes providing the functionality described herein may additionally or alternatively include entities enabling communications to any of a variety of RATs not illustrated in FIG. 2, which may include non-cellular technologies. Thus, the term "access node," as used in the embodiments described herein below, may include but is not necessarily limited to a gNB 210, ng-eNB 214 or WLAN 216.

In some embodiments, an access node, such as a gNB 210, ng-eNB 214, and/or WLAN 216 (alone or in combination with other components of the 5G NR positioning system 200), may be configured to, in response to receiving a request for location information from the LMF 220, obtain location measurements of uplink (UL) signals received from the UE 205) and/or obtain downlink (DL) location measurements from the UE 205 that were obtained by UE 205 for DL signals received by UE 205 from one or more access nodes. As noted, while FIG. 2 depicts access nodes (gNB 210, ng-eNB 214, and WLAN 216) configured to communicate according to 5G NR, LTE, and Wi-Fi communication protocols, respectively, access nodes configured to communicate according to other communication protocols may be used, such as, for example, a Node B using a Wideband Code Division Multiple Access (WCDMA) protocol for a Universal Mobile Telecommunications Service (UMTS) Terrestrial Radio Access Network (UTRAN), an eNB using an LTE protocol for an Evolved UTRAN (E-UTRAN), or a Bluetooth® beacon using a Bluetooth protocol for a WLAN. For example, in a 4G Evolved Packet System (EPS) providing LTE wireless access to UE 205, a RAN may comprise an E-UTRAN, which may comprise base stations comprising eNB s supporting LTE wireless access. A core network for EPS may comprise an Evolved Packet Core (EPC). An EPS may then comprise an E-UTRAN plus an EPC, where the E-UTRAN corresponds to NG-RAN 235 and the EPC corresponds to 5GCN 240 in FIG. 2. The methods and techniques described herein for obtaining a civic location for UE 205 may be applicable to such other networks.

The gNBs 210 and ng-eNB 214 can communicate with an AMF 215, which, for positioning functionality, communicates with an LMF 220. The AMF 215 may support mobility of the UE 205, including cell change and handover of UE 205 from an access node (e.g., gNB 210, ng-eNB 214, or WLAN 216) of a first RAT to an access node of a second RAT. The AMF 215 may also participate in supporting a signaling connection to the UE 205 and possibly data and voice bearers for the UE 205. The LMF 220 may support positioning of the UE 205 using a CP location solution when UE 205 accesses the NG-RAN 235 or WLAN 216 and may support position procedures and methods, including UE assisted/UE based and/or network based procedures/methods, such as Assisted GNSS (A-GNSS), Observed Time Difference Of Arrival (OTDOA) (which may be referred to in NR as Time Difference Of Arrival (TDOA)), Frequency Difference Of Arrival (FDOA), Real Time Kinematic (RTK), Precise Point Positioning (PPP), Differential GNSS (DGNSS), Enhance Cell ID (ECID), angle of arrival (AoA), angle of departure (AoD), WLAN positioning, round trip signal propagation delay (RTT), multi-cell RTT, and/or other positioning procedures and methods. The LMF 220 may also process location service requests for the UE 205, e.g., received from the AMF 215 or from the GMLC 225. The LMF 220 may be connected to AMF 215 and/or to GMLC 225. In some embodiments, a network such as SGCN 240 may additionally or alternatively implement other types of location-support modules, such as an Evolved Serving Mobile Location Center (E-SMLC) or a SUPL Location Platform (SLP). It is noted that in some embodiments, at least part of the positioning functionality (including determination of a UE 205's location) may be performed at the UE 205 (e.g., by measuring downlink PRS (DL-PRS) signals transmitted by wireless nodes such as gNBs 210, ng-eNB 214 and/or WLAN 216, and/or using assistance data provided to the UE 205, e.g., by LMF 220).

The Gateway Mobile Location Center (GMLC) 225 may support a location request for the UE 205 received from an external client 230 and may forward such a location request to the AMF 215 for forwarding by the AMF 215 to the LMF 220. A location response from the LMF 220 (e.g., containing a location estimate for the UE 205) may be similarly returned to the GMLC 225 either directly or via the AMF 215, and the GMLC 225 may then return the location response (e.g., containing the location estimate) to the external client 230.

A Network Exposure Function (NEF) 245 may be included in SGCN 240. The NEF 245 may support secure exposure of capabilities and events concerning SGCN 240 and UE 205 to the external client 230, which may then be referred to as an Access Function (AF) and may enable secure provision of information from external client 230 to SGCN 240. NEF 245 may be connected to AMF 215 and/or to GMLC 225 for the purposes of obtaining a location (e.g. a civic location) of UE 205 and providing the location to external client 230.

As further illustrated in FIG. 2, the LMF 220 may communicate with the gNBs 210 and/or with the ng-eNB 214 using an NR Positioning Protocol annex (NRPPa) as defined in 3GPP Technical Specification (TS) 38.455. NRPPa messages may be transferred between a gNB 210 and the LMF 220, and/or between an ng-eNB 214 and the LMF 220, via the AMF 215. As further illustrated in FIG. 2, LMF 220 and UE 205 may communicate using an LTE Positioning Protocol (LPP) as defined in 3GPP TS 37.355. Here, LPP messages may be transferred between the UE 205 and the LMF 220 via the AMF 215 and a serving gNB 210-1 or serving ng-eNB 214 for UE 205. For example, LPP messages may be transferred between the LMF 220 and the AMF 215 using messages for service-based operations (e.g., based on the Hypertext Transfer Protocol (HTTP)) and may be transferred between the AMF 215 and the UE 205 using a 5G NAS protocol. The LPP protocol may be used to support positioning of UE 205 using UE assisted and/or UE based position methods such as A-GNSS, RTK, TDOA, multi-cell RTT, AoD, and/or ECID. The NRPPa protocol may be used to support positioning of UE 205 using network based position methods such as ECID, AoA, uplink TDOA (UL-TDOA) and/or may be used by LMF 220 to obtain location related information from gNBs 210 and/or ng-eNB 214, such as parameters defining DL-PRS transmission from gNBs 210 and/or ng-eNB 214.

In the case of UE 205 access to WLAN 216, LMF 220 may use NRPPa and/or LPP to obtain a location of UE 205 in a similar manner to that just described for UE 205 access to a gNB 210 or ng-eNB 214. Thus, NRPPa messages may be transferred between a WLAN 216 and the LMF 220, via the AMF 215 and N3IWF 250 to support network-based positioning of UE 205 and/or transfer of other location information from WLAN 216 to LMF 220. Alternatively, NRPPa messages may be transferred between N3IWF 250 and the LMF 220, via the AMF 215, to support network-based positioning of UE 205 based on location related information and/or location measurements known to or accessible to N3IWF 250 and transferred from N3IWF 250 to LMF 220 using NRPPa. Similarly, LPP and/or LPP messages may be transferred between the UE 205 and the LMF 220 via the AMF 215, N3IWF 250, and serving WLAN 216 for UE 205 to support UE assisted or UE based positioning of UE 205 by LMF 220.

In a 5G NR positioning system 200, positioning methods can be categorized as being "UE assisted" or "UE based." This may depend on where the request for determining the position of the UE 205 originated. If, for example, the request originated at the UE (e.g., from an application, or "app," executed by the UE), the positioning method may be categorized as being UE based. If, on the other hand, the request originates from an external client 230, LMF 220, or other device or service within the 5G network, the positioning method may be categorized as being UE assisted (or "network-based").

With a UE-assisted position method, UE 205 may obtain location measurements and send the measurements to a location server (e.g., LMF 220) for computation of a location estimate for UE 205. For RAT-dependent position methods location measurements may include one or more of a Received Signal Strength Indicator (RSSI), Round Trip signal propagation Time (RTT), Reference Signal Received Power (RSRP), Reference Signal Received Quality (RSRQ), Reference Signal Time Difference (RSTD), Time of Arrival (TOA), AoA, Receive Time-Transmission Time Difference (Rx-Tx), Differential AoA (DAoA), AoD, or Timing Advance (TA) for gNBs 210, ng-eNB 214, and/or one or more access points for WLAN 216. Additionally or alternatively, similar measurements may be made of sidelink signals transmitted by other UEs, which may serve as anchor points for positioning of the UE 205 if the positions of the other UEs are known. The location measurements may also or instead include measurements for RAT-independent positioning methods such as GNSS (e.g., GNSS pseudorange, GNSS code phase, and/or GNSS carrier phase for GNSS satellites 207), WLAN, etc.

With a UE-based position method, UE 205 may obtain location measurements (e.g., which may be the same as or similar to location measurements for a UE assisted position method) and may further compute a location of UE 205

(e.g., with the help of assistance data received from a location server such as LMF 220, an SLP, or broadcast by gNBs 210, ng-eNB 214, or WLAN 216).

With a network based position method, one or more base stations (e.g., gNBs 210 and/or ng-eNB 214), one or more APs (e.g., in WLAN 216), or N3IWF 250 may obtain location measurements (e.g., measurements of RSSI, RTT, RSRP, RSRQ, AoA, or TOA) for signals transmitted by UE 205, and/or may receive measurements obtained by UE 205 or by an AP in WLAN 216 in the case of N3IWF 250, and may send the measurements to a location server (e.g., LMF 220) for computation of a location estimate for UE 205.

Positioning of the UE 205 also may be categorized as UL, DL, or DL-UL based, depending on the types of signals used for positioning. If, for example, positioning is based solely on signals received at the UE 205 (e.g., from a base station or other UE), the positioning may be categorized as DL based. On the other hand, if positioning is based solely on signals transmitted by the UE 205 (which may be received by a base station or other UE, for example), the positioning may be categorized as UL based. Positioning that is DL-UL based includes positioning, such as RTT-based positioning, that is based on signals that are both transmitted and received by the UE 205. Sidelink (SL)-assisted positioning comprises signals communicated between the UE 205 and one or more other UEs. According to some embodiments, UL, DL, or DL-UL positioning as described herein may be capable of using SL signaling as a complement or replacement of SL, DL, or DL-UL signaling.

Depending on the type of positioning (e.g., UL, DL, or DL-UL based) the types of reference signals used can vary. For DL-based positioning, for example, these signals may comprise PRS (e.g., DL-PRS transmitted by base stations or SL-PRS transmitted by other UEs), which can be used for TDOA, AoD, and RTT measurements. Other reference signals that can be used for positioning (UL, DL, or DL-UL) may include Sounding Reference Signal (SRS), Channel State Information Reference Signal (CSI-RS), synchronization signals (e.g., synchronization signal block (SSB) Synchronizations Signal (SS)), Physical Uplink Control Channel (PUCCH), Physical Uplink Shared Channel (PUSCH), Physical Sidelink Shared Channel (PSSCH), Demodulation Reference Signal (DMRS), etc. Moreover, reference signals may be transmitted in a Tx beam and/or received in an Rx beam (e.g., using beamforming techniques), which may impact angular measurements, such as AoD and/or AoA.

Figure 3A:
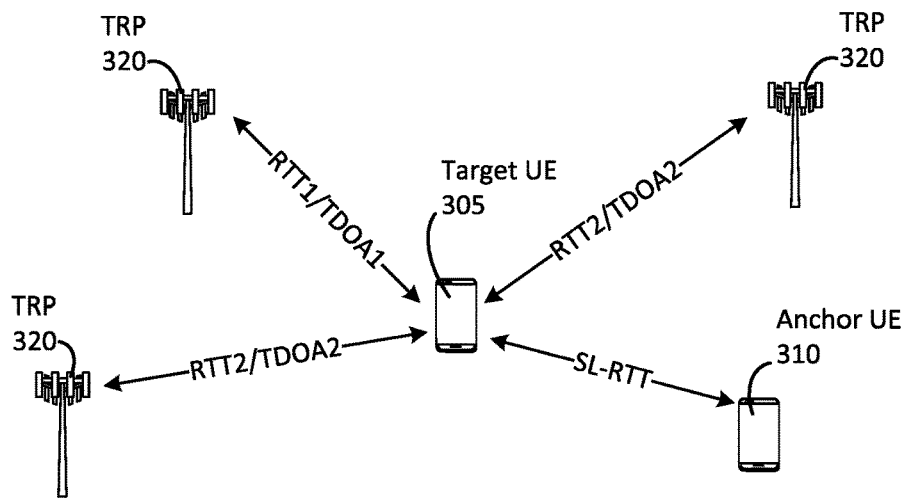
FIGS. 3A-3C are simplified diagrams of scenarios in which sidelink (SL) positioning may be used to determine the position of a target UE, according to some embodiments.
Figure 3B:
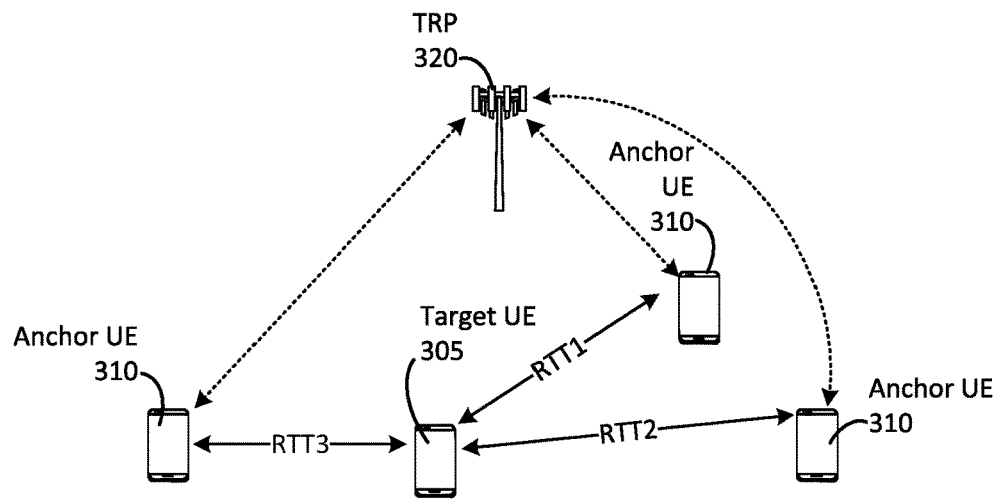
Figure 3C:
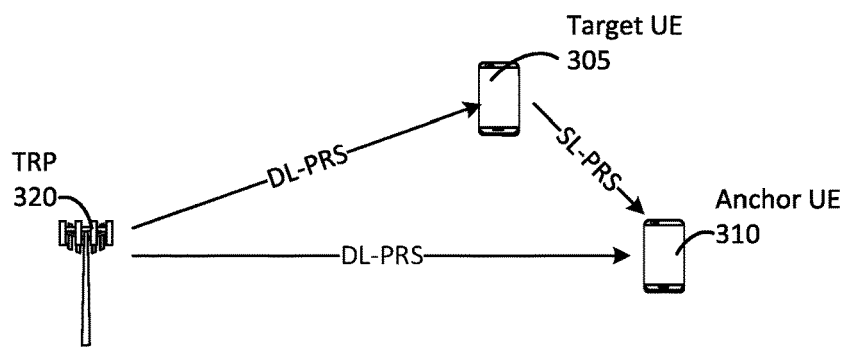

FIGS. 3A-3C are simplified diagrams of scenarios in which sidelink positioning may be used to determine the position of a target UE 305, according to some embodiments. One or more anchor UEs 310 may be used to send and/or receive reference signals via sidelink. As illustrated, positioning may be further determined using one or more base stations 320 (a Uu interface). It will be understood, however, that the signals used for positioning of the UE 305 may vary, depending on desired functionality. More particularly, some types of positioning may utilize signals other than RTT/TDOA as illustrated in FIGS. 3A-3C.

The diagram of FIG. 3A illustrates a configuration in which the positioning of a target UE 305 may comprise RTT and/or TDOA measurements between the target UE 305 and three base stations 320. In this configuration, the target UE 305 may be in coverage range for DL and/or UL signals via Uu connections with the base stations 320. Additionally, the anchor UE 310 at a known location may be used to improve the position determination for the target UE 305 by providing an additional anchor. As illustrated, ranging may be performed between the target UE 305 and anchor UE 310 by taking RTT measurements via the sidelink connection between the target UE 305 and anchor UE 310.

The diagram of FIG. 3B illustrates a configuration in which the positioning of a target UE 305 may sidelink only (SL-only) positioning/ranging. In this configuration, the target UE 305 may perform RTT measurements via sidelink connections between a plurality of anchor UEs 310. In this example, the target UE 305 may not be in UL coverage of the base station 320, and therefore each anchor UE 310 may report RTT measurement information to the network of via a Uu connection between each anchor UE 310 and the base station 320. (In cases in which a UE relays information between a remote UE and a base station, a UE may be referred to as a "relay" UE.) Such scenarios may exist when the target UE 305 has weaker transmission power than anchor UEs 310 (e.g., the target UE 305 comprises a wearable device, and anchor UEs comprise larger cellular phones, IOT devices, etc.). In other scenarios in which the target UE 305 is within UL coverage of the base station 320, the target UE 305 may report RTT measurements directly to the base station 320. In some embodiments, no base station 320 may be used, in which case one of the UEs (e.g., the target UE 305 or one of the anchor UEs 310) may receive RTT measurement information and determine the position of the target UE 305.

The diagram of FIG. 3C illustrates a configuration in which the positioning of a target UE 305 may comprise the target UE 305 and anchor UE 310 receiving a reference signal (DL-PRS) from the base station 320, and the target UE 305 sending a reference signal (SL-PRS) to the anchor UE 310. The positioning of the target UE can be determined based on known positions of the base station 320 and anchor UE 310 and a time difference between a time at which the anchor UE 310 receiving the reference signal from the base station 320 and a time at which the anchor UE 310 receives the reference signal from the target UE 305.

The use of sidelink positioning (e.g., SL-only or Uu/SL positioning, as illustrated in FIGS. 3A-3C) may utilize a Resource Pool for Positioning (RP-P). RP-P may be conveyed to UEs via a sidelink configuration (e.g., using techniques described hereafter), and may designate particular resource pools for sidelink reference signals in different scenarios. Resource pools comprise a set of resources (e.g., frequency and time resources in in an orthogonal frequency-division multiplexing (OFDM) scheme used by 4G and 5G cellular technologies) that may be used for the transmission of RF signals via sidelink for positioning. Each resource pool may further include a particular subcarrier spacing (SCS), cyclic prefix (CP) type, bandwidth (BW) (e.g., subcarriers, bandwidth part, etc.), time-domain location (e.g., periodicity and slot offset) Resource pools may comprise, for example, Tx resource pools for "Mode 1" sidelink positioning in which sidelink positioning is performed using one or more network-connected UEs, in which case network-based resource allocation may be received by a network-connected UE via a Uu interface with a base station (e.g., via Downlink Control Information (DCI) or Radio Resource Control (RRC)). Tx resource pools for "Mode 2" sidelink positioning in which autonomous resource selection is performed by UEs without network-based resource allocation. Resource pools may further comprise Rx resource pools, which may be used in either Mode 1 or Mode 2 sidelink positioning. Each RP-P configuration may be relayed via a physical sidelink control channel (PSCCH), which may reserve one or more SL-PRS configurations. Each of the one or more SL-PRS configurations of in RP-P may include respective specific physical layer features such as a number of symbols, comb type, comb-offset, number of subchannels, some channel size, and start resource block (RB). The RP-P configuration may further include a sensing configuration, power control, and/or Channel Busy Ratio (CBR).

According to some embodiments, exceptional RP-P can be designated and used in circumstances in which it may not be desirable or possible to perform sidelink positioning via the available resource pools of non-exceptional RP-P for sidelink. Such exceptional cases may include situations similar to those that trigger the use of exceptional resource pools for communication, such as situations in which there may be physical layer problems, before the UE finishes and initiated connection, or during a handover of the UE. As with non-exceptional RP-P for sidelink, exceptional RP-P for sidelink may be configured or preconfigured, and may be allocated by the network or autonomously selected (e.g., used in Mode 1 or Mode 2 sidelink positioning). Further, according to some embodiments, exceptional RP-P may be preconfigured, preloaded, and/or hardcoded into UEs for different geographic regions or areas. Different countries, for example, may designate particular resources for exceptional RP-P in cases of public safety. Exceptional RP-P may be configured via dedicated signaling (e.g., PC5) and/or configured via System Information Block (SIB) via a Uu interface. In some embodiments, the exceptional RP-P may be broadcasted during the positioning session setup phase or discovery phase of a UE. Additionally or alternatively, exceptional RP-P may be assigned or allocated using resource reservation techniques.

In various aspects of a wireless communication network, including positioning, communicating a QCL relation to a wireless device may enable the wireless device to efficiently determine various wireless characteristics. In particular, a QCL relation indicates whether two signals (or functional channels) share common large-scale wireless properties (e.g., avg. delay, delay spread, Doppler shift, Doppler spread) and/or same RX spatial filter. Two signals that share a QCL relation be described as being "QCLed." In a cellular network (e.g., a 5G network), a QCL relation may be indicated using Transmission Configuration Indication (TCI).

Embodiments herein implement a multi-anchor SL QCL (which may be referred to as "mSL-QCL") that can be utilized in a multi-anchor SL positioning and/or RF sensing scenario. In particular, mSL-QCL can be communicated to a receiving UE (e.g., for performing RF sensing or, as previously indicated, to a target UE for positioning) when two or more signals (or functional channels) sent by two or more SL anchors (over two or more different links) and received at the receiving UE share common large-scale wireless properties (e.g., avg. delay, delay spread, Doppler shift, Doppler spread, etc.) and/or the same RX spatial filter. Providing mSL-QCL information to a receiving UE in this manner can help enable many features, including enhanced selection of TRPs for SL-based RF fingerprint positioning (RFFP), SL-based RF sensing design, SL-based coordinated sensing, SL CoMP, SL interference management, multi-SL anchor beam management, etc. as described in more detail below, mSL-QCL may be communicated to a receiving UE via a modified TCI from a base SL anchor, which can be helpful when a receiving UE is out-of-coverage and cannot receive this information from a cellular base station. Even so, some embodiments may provide for a base station (e.g., gNB) to communicate the mSL-QCL to a receiving UE.

Figure 4:
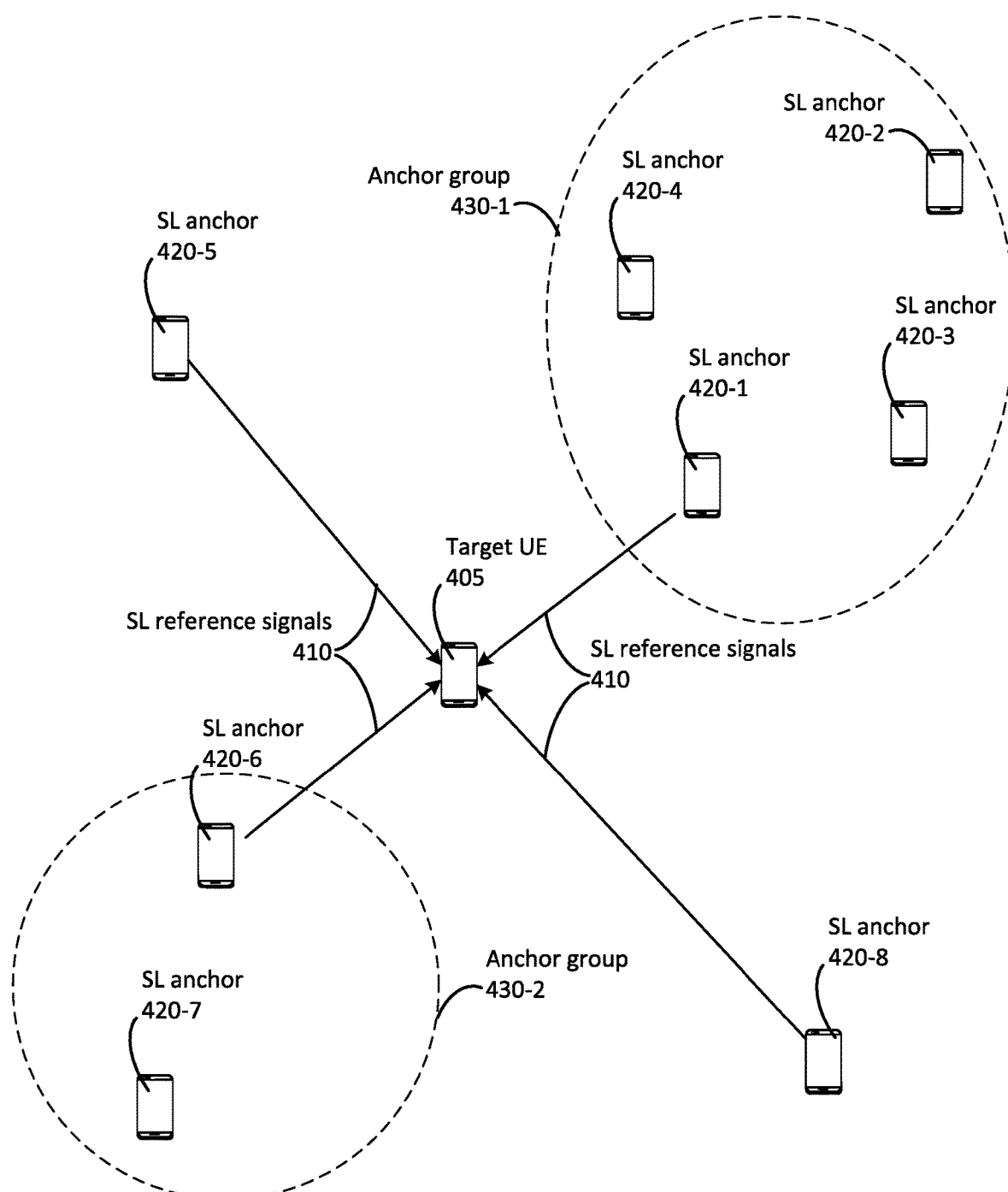
FIG. 4 is a diagram illustrating a scenario in which multi-anchor SL Quasi Colocation (QCL) (mSL-QCL) may be utilized, according to an embodiment.

FIG. 4 is a diagram illustrating a scenario in which mSL-QCL may be utilized. In this example, positioning of a target UE 405 is desired based, at least in part, on SL reference signals 410 communicated via SL (a PC5 link) from a plurality of SL anchors (collectively and generically referred to as SL anchors 420). These reference signals may be used, for example, for positioning-related measurements such as RTT, TDOA, etc.

In this example, the target UE 405 may select four SL anchors 420 as anchor points for positioning. Because greater spatial diversity among anchor points can lead to better positioning accuracy, it may be preferable for the target UE 405 to select an SL anchor 420 from each of anchor group 430-1 and anchor group 430-2 (where SL anchors from each group are similarly situated spatially with respect to the target UE 405). (Ultimately, as shown in FIG. 4, the target UE 405 may settle on utilizing SL reference signals 410 from SL anchors 420-1, 420-5, 420-6, and 420-8.)

According to embodiments, the target UE 405 can be provided with mSL-QCL to allow the target UE 405 to make the selection without probing all of the SL anchors 420. For example, SL anchor 420-1 can identify a QCL relation to the target UE 405 (e.g., among SL anchors of the anchor group 430-1) to enable the target UE 405 to exclude SL anchors 420-2, 420-3, and 420-4. Similarly, SL anchor 420-6 may identify a QCL relation to the target UE 405 (e.g., among SL anchors of the anchor group 430-2) to enable the target UE 405 to exclude SL anchor 420-7 as a positioning anchor.

According to embodiments, mSL-QCL may include information included in traditional QCL. This includes, for example, a common average delay, delay spread, Doppler shift, Doppler spread, and/or RX spatial filter between QCLed signals. A receiving UE (e.g., target UE 405) can rely on mSL-QCL information for channel estimation and beam operation for different PHY channels and symbols. Moreover, mSL-QCL may support QCL types utilized in current applicable 3GPP specifications, indicating which signal aspects are shared between QCLed signals. This includes QCL Type A (average delay, delay spread, Doppler shift, Doppler spread), QCL Type B (Doppler shift, Doppler spread), QCL Type C (Avg. delay, Doppler shift), and QCL Type D (Spatial RX relation).

It can be noted that embodiments are not limited to positioning a target UE. As previously noted, mSL-QCL may be utilized, for example, when performing RF sensing. In such instances, a receiving UE may receive signals in a multi-static RF sensing configuration in which a plurality of anchor UEs transmit reference signals. The reflections of these signals from one or more objects before being received by the receiving UE may be measured for the detecting and/or positioning of the one or more objects. The mSL-QCL as described herein may be used by the receiving UE to determine QCL-related that features the reference signals.

According to embodiments, TCI may be used to communicate mSL-QCL to a receiving UE. As noted, TCI is traditionally used by a base station to indicate QCL relations of physical (PHY) channels and/or reference signals to a UE. TCI can include a table of TCI state IDs associated with one or more reference signals and QCL types, such that the TCI state ID may later be referred to with respect to a signal to indicate a QCL reference type of the signal. For example, a TCI state ID "1" (e.g., a first entry in a table included in the TCI) may indicate SSB-1 as a first downlink reference signal with a QCL type A and CSI-RS-1 as a second downlink reference signal with QCL type D. For a signal that is later transmitted having this QCL relationship, the base station can indicate this QCL relationship to a UE by referencing TCI state ID 1. In traditional TCI, a UE is updated with TCI through RRC configurations, and changes in TCI may be signaled through media access control-control element (MAC-CE) signaling and/or DCI signaling. According to embodiments, TCI communicating mSL-QCL may be provided in a similar manner, however it may be provided by a "base" SL anchor that determines the QCL relationship and relays this to a receiving UE.

Figure 5:
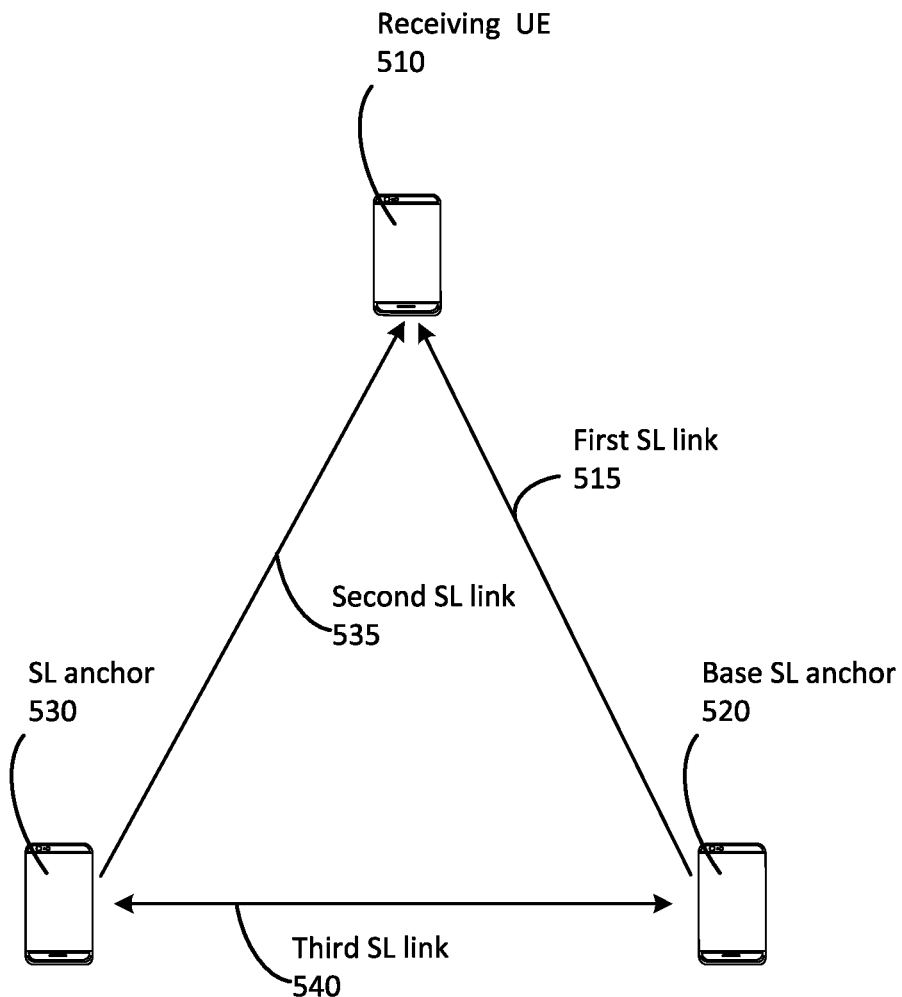
FIG. 5 is a diagram illustrating a simple scenario in which a receiving user equipment (UE) is provided mSL-QCL via a first SL link by a base SL anchor.

FIG. 5 is a diagram illustrating a simple scenario in which a receiving UE 510 is provided mSL-QCL via a first SL link 515 by a base SL anchor 520. The mSL-QCL indicates a QCL relationship between a first reference signal/antenna port sent by the base SL anchor 520 via the first SL link 515 and second reference signal/antenna port sent by the SL anchor 530 via a second SL link 535. The base anchor 520 and SL anchor 530 may communicate via ⅓ SL link 540 to determine a QCL relation between first and second reference signals/antenna ports. Depending on desired functionality, the first and second reference signals/antenna ports may comprise SL-SSB, SL-CSI-RS, SL-PRS, PSSCH, PSCCH, PSFCH, or the like. Moreover, this basic concept can be extended to multiple UEs multiple UEs and corresponding RSs/antenna ports.

To allow TCI to communicate mSL-QCL, some modifications may be made to the current TCI structure. For example, some embodiments may implement an extended TCI-state design, or "mSL-TCI" (which may be defined as "mSL-TCI-State" in relevant 3GPP specifications), where the extend TCI-state includes info about mSL-QCL. TCI states defined in this design may include a range of TCI state IDs ("tci-StateId") for indicating multi-sidelink QCL relations. Further, a QCL information data structure ("QCL-Info") may include information similar to the existing QCL information data structure, but may also include an explicit indication/identification of a base SL anchor. Additionally or alternatively, a reference signal indication ("referenceSignal") in current TCI may be modified to include an indication/identification of the origin (Tx point) of a reference signal. In some embodiments, this indication may comprise the SL-ID (e.g., L2-identity of SL-anchor, SL-RNTI, RNTI, SL-cell ID), which may accompany an indication of the reference signal type (e.g., SSB, CSI-RS, SSB-Index, etc.).

Figure 6:
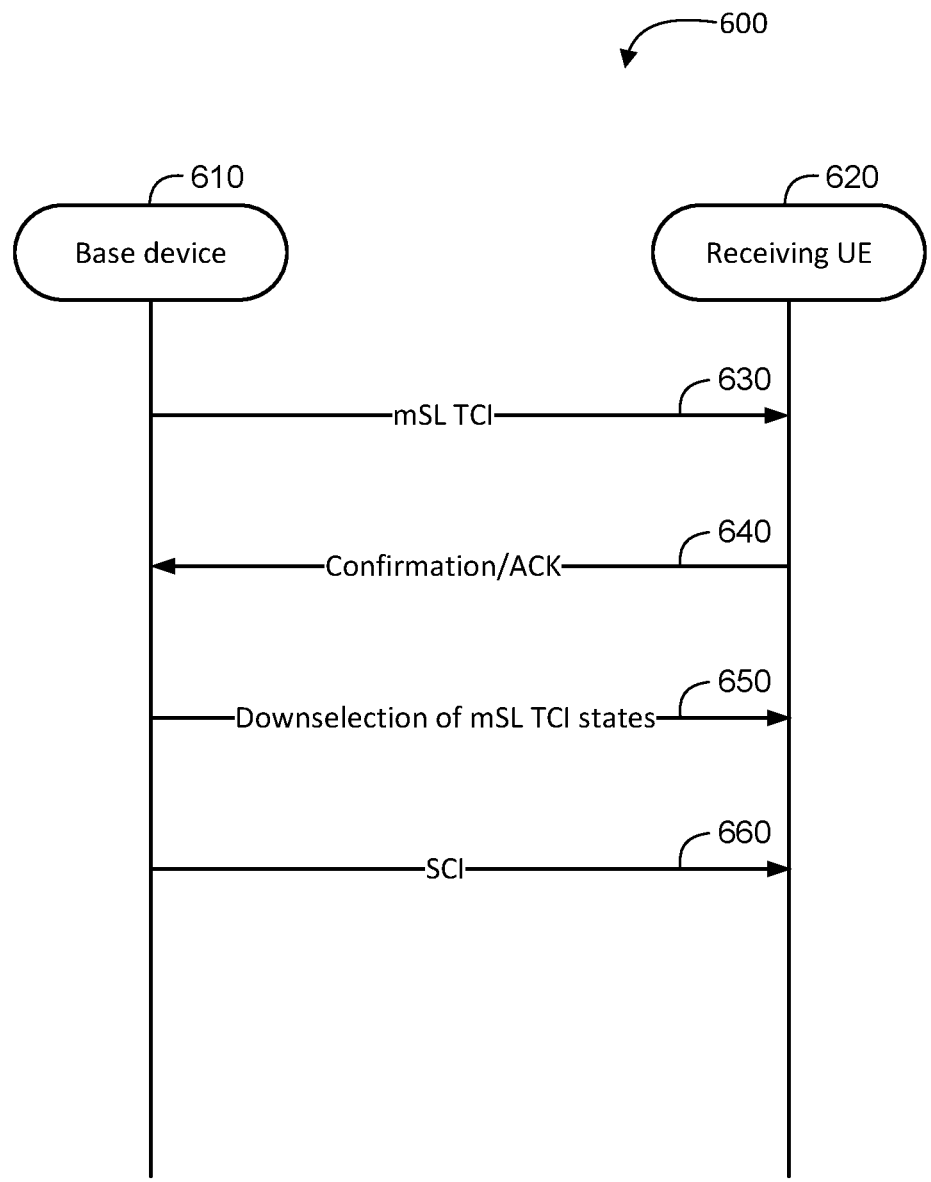
FIG. 6 is a call-flow diagram illustrating an example method for communicating mSL-QCL from a base device to a receiving UE, according to an embodiment.

FIG. 6 is a call-flow diagram illustrating an example method 600 for communicating mSL-QCL from a base device 610 to a receiving UE 620, according to an embodiment. As previously noted, a base device may comprise a base SL anchor or a base station (e.g., if the receiving UE 620 is connected to a network). In the method 600 the base device 610 may provide the receiving UE 620 with a mSL TCI (e.g., a TCI having the modifications for communicating multi-anchor TCI as discussed previously), as indicated by arrow 630. In the mSL TCI, the base device 610 may configure the receiving UE 620 with a list of N mSL TCI states. In some embodiments, this may be provided via RRC communication, e.g., as part of a RRCReconfigurationSidelink message. As shown by arrow 640, the receiving UE 620 can respond by providing a confirmation or acknowledgement message (ACK), indicating to the base device 610 that the receiving UE 620 has been successfully configured with the mSL TCI.

As indicated by arrow 650, the base device 610 may later provide the receiving UE 620 with a downselection of the previously-defined mSL TCI states. Here (e.g., similar to traditional TCI) the base device 610 may identify a subset of the mSL TCI (e.g., a set of L mSL TCI states within the list of N mSL TCI states) that may be used for a given application or period of time. According to some embodiments, this information may be conveyed from the base device 610 to the receiving UE 620 via MAC-CE. Further, as shown by arrow 660, the base device 610 can select and/or indicate a change of mSL TCI states (e.g., from the set of L mSL TCI states conveyed in the message shown by arrow 650) using SL control information (SCI).

Figure 7:
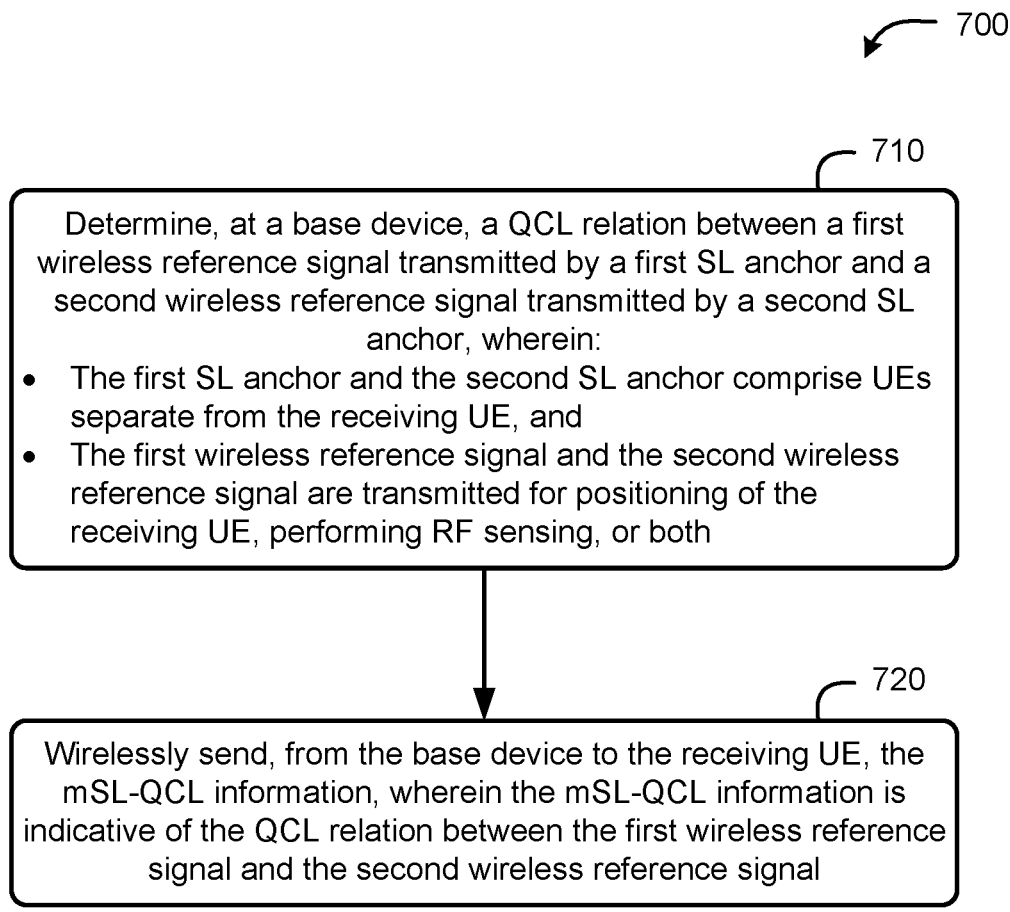
FIG. 7 is a flow diagram of a method of configuring a receiving UE for mSL-QCL information, according to an embodiment, according to an embodiment.

FIG. 7 is a flow diagram of a method 700 of configuring a receiving UE for mSL-QCL information, according to an embodiment. The functionality illustrated in one or more of the blocks shown in FIG. 7 may be performed by hardware and/or software components of a base device, which may comprise a base SL anchor UE or base station, as described herein. Example components of a UE are provided hereafter with respect to FIG. 9, and example components of a base station are provided hereafter with respect to FIG. 10.

At block 710, the functionality comprises determining, at a base device, a QCL relation between a first wireless reference signal transmitted by a first SL anchor and a second wireless reference signal transmitted by a second SL anchor, wherein: the first SL anchor and the second SL anchor comprise UEs separate from the receiving UE and, possibly, having known locations, and the first wireless reference signal and the second wireless reference signal are transmitted for positioning of the receiving UE, performing RF sensing, or both. Here, the functionality may reflect the functionality illustrated in FIG. 5 with respect to a base SL anchor, SL anchor, and receiving UE. In such instances, the base device comprises the first SL anchor (which may correspond with base SL anchor 520 in FIG. 5). In such embodiments, determining the QCL relation between the first wireless reference signal and the second wireless reference signal may comprise the first SL anchor communicating, via an SL link, with the second SL anchor. As previously indicated, this may include using SL measurement configuration reporting (e.g., to determine a physical relationship/proximity between the first and second SL anchors). For example, if the first and second SL anchors are determined to be close, a spatial QCL relation (e.g., QCL Type D) may be determined between the first and second signals. Alternatively, the base device may comprise a base station of a wireless communication network. In such embodiments, the determination made at block 710 made by the base station based on information obtained from each SL anchor, or obtained by one SL anchor and relayed to the base station/wireless communication network. According to some embodiments, the first SL anchor and the second SL anchor may have known locations, which could include absolute locations in a global coordinate system, locations in a relative coordinate system and/or relative to an object with a known location, or the like. According to some embodiments, the locations of the first SL anchor and the second SL anchor may be determined together (e.g., in the same positioning session) with the receiving UE.

As previously indicated, reference signals may comprise any of a variety of type of signals that may be utilized for positioning of and/or RF sensing performed using the receiving UE. Thus, according to some embodiments, the first wireless reference signal, the second wireless reference signal, or both, comprise an SL synchronization signal block (SL-SSB), an SL channel state information reference signal (SL-CSI-RS), an SL positioning reference signa (SL-PRS), a physical sidelink shared channel (PSSCH), physical sidelink control channel (PSCCH), or physical sidelink feedback channel (PSFCH), or a combination thereof.

Figure 9:
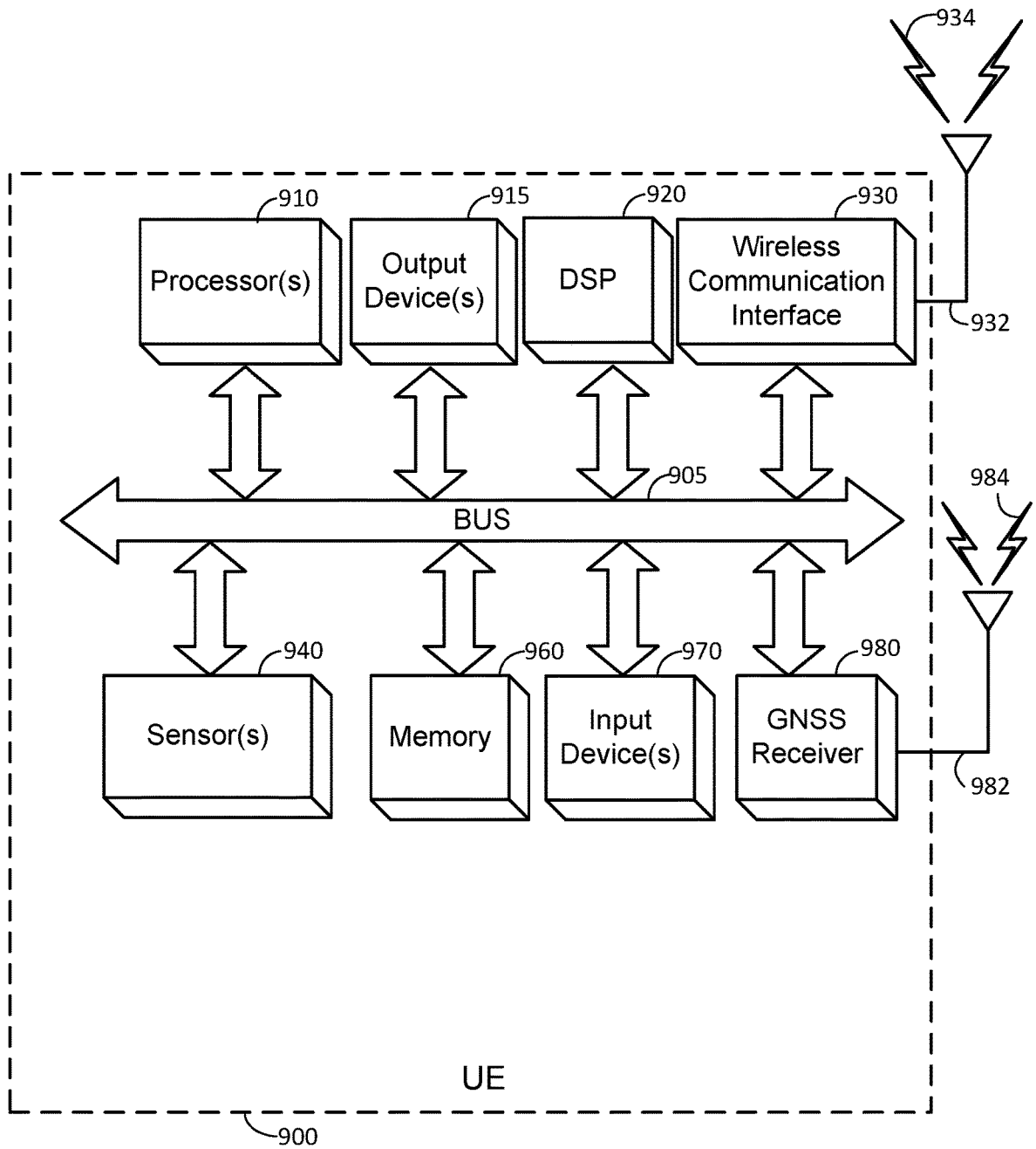
FIG. 9 is a block diagram of an embodiment of a UE, which can be utilized in embodiments as described herein.
Figure 10:
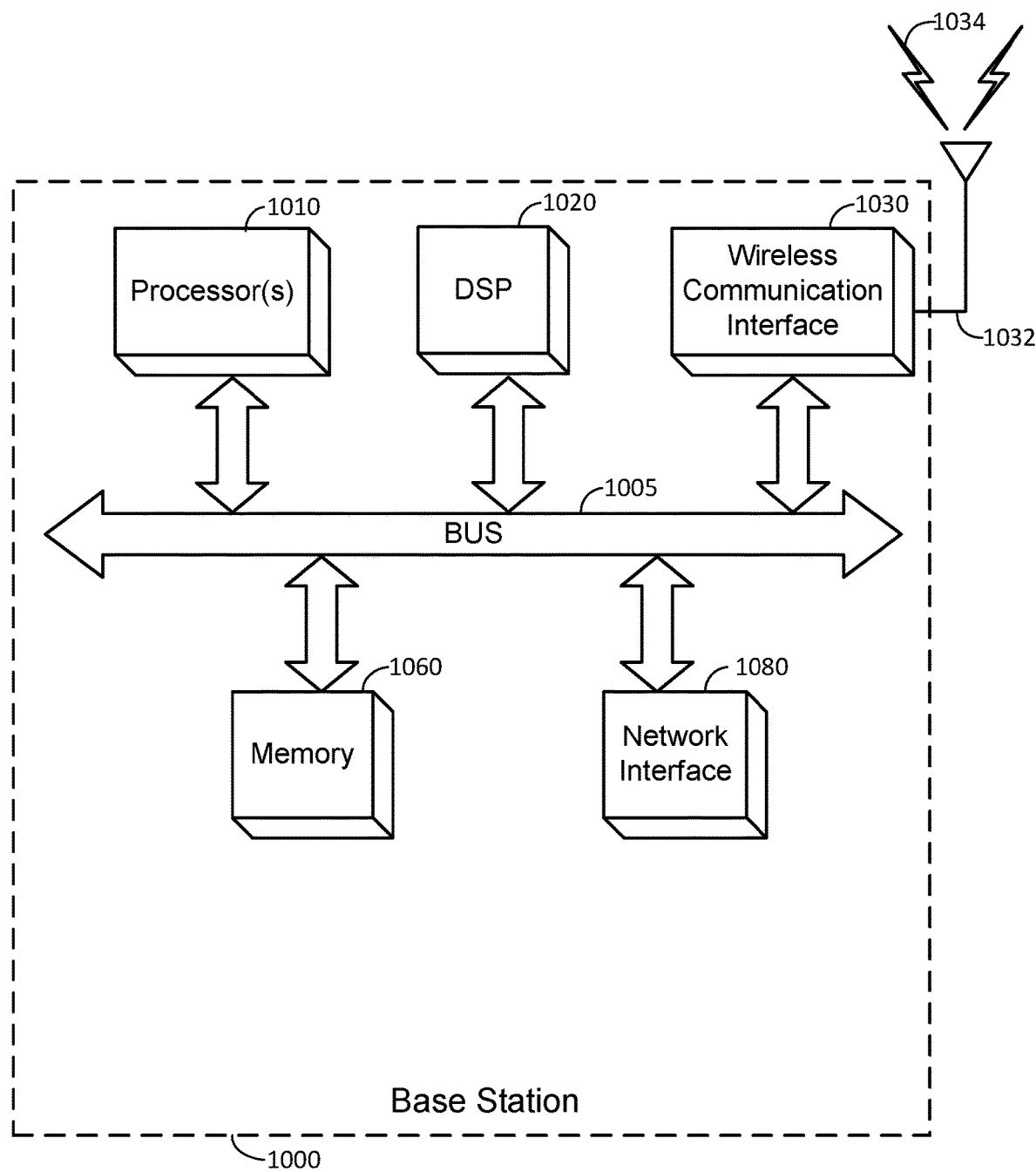
FIG. 10 is a block diagram of an embodiment of a base station, which can be utilized in embodiments as described herein.

For embodiments in which the base device comprises a UE, means for performing functionality at block 710 may comprise a bus 905, processor(s) 910, DSP 920, wireless communication interface 930, memory 960, GNSS receiver 980, and/or other components of a UE, as illustrated in FIG. 9. For embodiments in which the base device comprises a base station, means for performing functionality at block 710 may comprise a bus 1005, processor(s) 1010, DSP 1020, wireless communication interface 1030, memory 1060, and/or other components of a UE, as illustrated in FIG. 10.

At block 720, the functionality comprises wirelessly sending, from the base device to the receiving UE, the mSL-QCL information, wherein the mSL-QCL information is indicative of the QCL relation between the first wireless reference signal and the second wireless reference signal. As previously noted, this QCL relation can lead to efficiencies at the receiving UE. As noted in previously-described embodiments, the information may be included in TCI (e.g., which may be modified as indicated herein to support mSL-QCL). As such, according to some embodiments of the method 700, wirelessly sending the mSL-QCL information may comprise including the mSL-QCL information in a TCI. In some embodiments, the TCI may comprise an mSL TCI in which a TCI state specific to mSL is used, an identity of the first SL anchor is included, or an identity of a reference signal origin is included, or a combination thereof.

As noted elsewhere herein, different layers/message types may be used to communicate mSL-QCL information. For example, according to some embodiments, wirelessly sending the mSL-QCL information may comprise including the mSL-QCL information in an RRC message. As described herein, this RRC message may include at least a portion of the mSL-QCL information an initial list or index of mSL-TCI states, which may be referenced in one or more subsequent messages with respect to certain SL signals. Additionally or alternatively, wirelessly sending the mSL-QCL information may comprise indicating the QCL relation between the first wireless reference signal and the second wireless reference signal via SCI (e.g., in instances in which the base device is a UE) or DCI (e.g., in instances in which the base device is a base station). This indication of the QCL relation may reference the previous list of mSL-TCI states.

For embodiments in which the base device comprises a UE, means for performing functionality at block 720 may comprise a bus 905, processor(s) 910, DSP 920, wireless communication interface 930, memory 960, GNSS receiver 980, and/or other components of a UE, as illustrated in FIG. 9. For embodiments in which the base device comprises a base station, means for performing functionality at block 720 may comprise a bus 1005, processor(s) 1010, DSP 1020, wireless communication interface 1030, memory 1060, and/or other components of a UE, as illustrated in FIG. 10.

Figure 8:
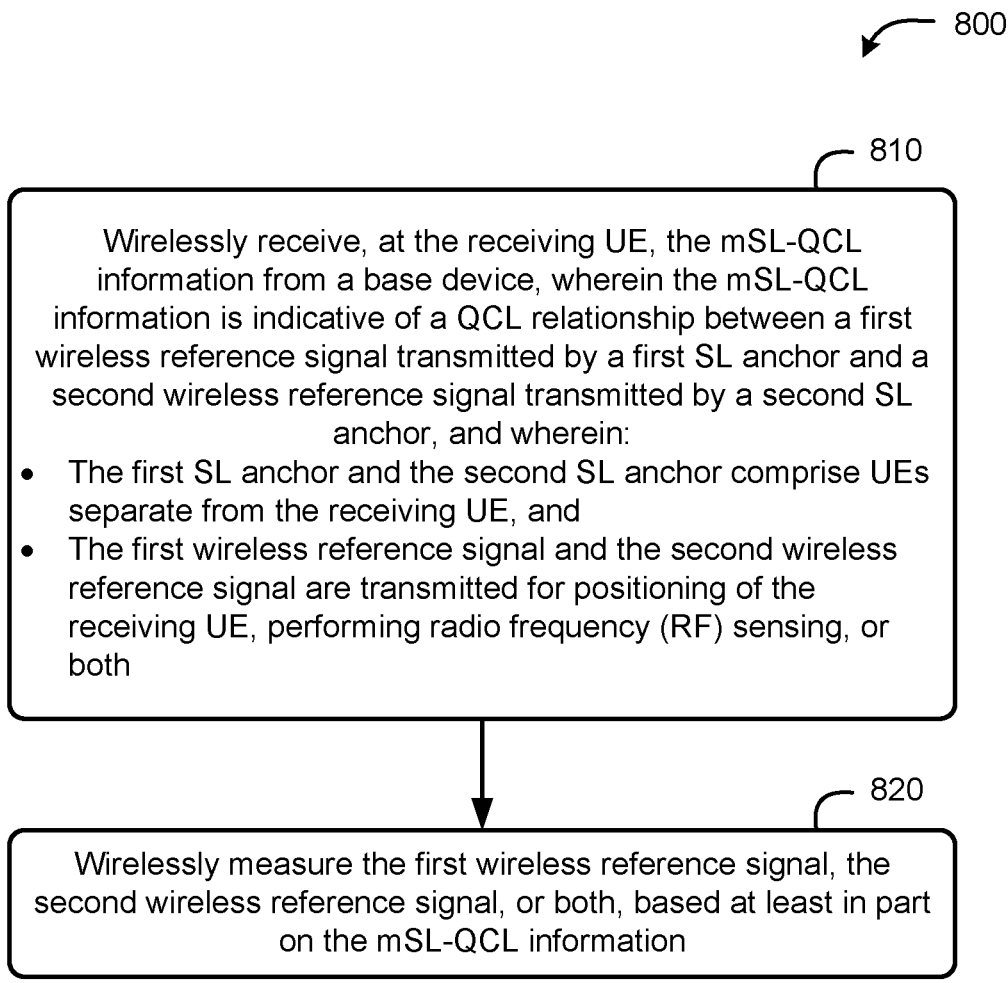
FIG. 8 is a flow diagram of a method at a receiving UE for utilizing mSL-QCL information, according to an embodiment

FIG. 8 is a flow diagram of a method 800 at a receiving UE for utilizing mSL-QCL information, according to an embodiment. The functionality illustrated in one or more of the blocks shown in FIG. 7 may be performed by hardware and/or software components of a receiving UE, as described herein. Again, example components of a UE are provided hereafter with respect to FIG. 9.

At block 810, the functionality comprises wirelessly receiving, at the receiving UE, the mSL-QCL information from a base device, wherein the mSL-QCL information is indicative of a QCL relationship between a first wireless reference signal transmitted by a first SL anchor and a second wireless reference signal transmitted by a second SL anchor, and wherein the first SL anchor and the second SL anchor comprise UEs separate from the receiving UE and possibly having known locations, and the first wireless reference signal and the second wireless reference signal are transmitted for positioning of the receiving UE, performing radio frequency (RF) sensing, or both. As previously noted, the base device may comprise the first SL anchor or a base station of a wireless communication network. Again, the reference signals may comprise any of a variety of reference signals used for positioning and/or RF sensing. Accordingly, according to some embodiments of the method 800, first wireless reference signal, the second wireless reference signal, or both, may comprise an SL synchronization signal block (SL-SSB), an SL channel state information reference signal (SL-CSI-RS), an SL positioning reference signal (SL-PRS), a physical sidelink shared channel (PSSCH), physical sidelink control channel (PSCCH), or physical sidelink feedback channel (PSFCH), or a combination thereof. Again, the first SL anchor and the second SL anchor may have known locations, which could include absolute locations in a global coordinate system, locations in a relative coordinate system and/or relative to an object with a known location, or the like. According to some embodiments, the locations of the first SL anchor and the second SL anchor may be determined together (e.g., in the same positioning session) with the receiving UE.

As noted, TCI may be utilized in some embodiments. As such, according to some embodiments of the method 800, wirelessly receiving the mSL-QCL information comprises receiving the mSL-QCL information in TCI. In such embodiments, the TCI may comprise an mSL TCI in which a TCI state specific to mSL is used, an identity of the first SL anchor is included, or an identity of a reference signal origin is included, or a combination thereof.

Means for performing functionality at block 810 may comprise a bus 905, processor(s) 910, DSP 920, wireless communication interface 930, memory 960, GNSS receiver 980, and/or other components of a UE, as illustrated in FIG. 9.

At block 820, the functionality comprises wirelessly measuring the first wireless reference signal, the second wireless reference signal, or both, based at least in part on the mSL-QCL information. Because measurements can be informed on the QCL relation, measurements may be made—and/or not made—based on the QCL relation. As noted with regard to FIG. 4, some measurements may be omitted if a QCL relation indicates a lack of spatial diversity between the signals. Accordingly, according to some embodiments of the method 800, wirelessly measuring comprises refraining from measuring the first wireless reference signal or the second wireless reference signal based at least in part on the QCL relation between the first wireless reference signal and the second wireless reference signal. That said, other QCL relation types might cause a receiving device to measure both signals.

Means for performing functionality at block 820 may comprise a bus 905, processor(s) 910, DSP 920, wireless communication interface 930, memory 960, GNSS receiver 980, and/or other components of a UE, as illustrated in FIG. 9.

FIG. 9 is a block diagram of an embodiment of a UE 900, which can be utilized as described herein above (e.g., in association with the previously-described figures, with respect to a receiving device/UE, target UE, SL anchor, etc.). It should be noted that FIG. 9 is meant only to provide a generalized illustration of various components, any or all of which may be utilized as appropriate. Furthermore, the functionality of the UE discussed herein may be executed by one or more of the hardware and/or software components illustrated in FIG. 9.

The UE 900 is shown comprising hardware elements that can be electrically coupled via a bus 905 (or may otherwise be in communication, as appropriate). The hardware elements may include a processor(s) 910 which can include without limitation one or more general-purpose processors (e.g., an application processor), one or more special-purpose processors (such as digital signal processor (DSP) chips, graphics acceleration processors, application specific integrated circuits (ASICs), and/or the like), and/or other processing structures or means. Processor(s) 910 may comprise one or more processing units, which may be housed in a single integrated circuit (IC) or multiple ICs. As shown in FIG. 9, some embodiments may have a separate DSP 920, depending on desired functionality. Location determination and/or other determinations based on wireless communication may be provided in the processor(s) 910 and/or wireless communication interface 930 (discussed below). The UE 900 also can include one or more input devices 970, which can include without limitation one or more keyboards, touch screens, touch pads, microphones, buttons, dials, switches, and/or the like; and one or more output devices 915, which can include without limitation one or more displays (e.g., touch screens), light emitting diodes (LEDs), speakers, and/or the like.

The UE 900 may also include a wireless communication interface 930, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, a WAN device, and/or various cellular devices, etc.), and/or the like, which may enable the UE 900 to communicate with other devices as described in the embodiments above. The wireless communication interface 930 may permit data and signaling to be communicated (e.g., transmitted and received) with TRPs of a network, for example, via eNBs, gNBs, ng-eNBs, access points, various base stations and/or other access node types, and/or other network components, computer systems, and/or any other electronic devices communicatively coupled with TRPs, as described herein. The communication can be carried out via one or more wireless communication antenna(s) 932 that send and/or receive wireless signals 934. According to some embodiments, the wireless communication antenna(s) 932 may comprise a plurality of discrete antennas, antenna arrays, or any combination thereof. The antenna(s) 932 may be capable of transmitting and receiving wireless signals using beams (e.g., Tx beams and Rx beams). Beam formation may be performed using digital and/or analog beam formation techniques, with respective digital and/or analog circuitry. The wireless communication interface 930 may include such circuitry.

Depending on desired functionality, the wireless communication interface 930 may comprise a separate receiver and transmitter, or any combination of transceivers, transmitters, and/or receivers to communicate with base stations (e.g., ng-eNBs and gNBs) and other terrestrial transceivers, such as wireless devices and access points. The UE 900 may communicate with different data networks that may comprise various network types. For example, one such network type may comprise a wireless wide area network (WWAN), which may be a code-division multiple access (CDMA) network, a time division multiple access (TDMA) network, a frequency division multiple access (FDMA) network, an orthogonal frequency division multiple access (OFDMA) network, a single-carrier frequency division multiple access (SC-FDMA) network, a WiMAX (IEEE 802.16) network, and so on. A CDMA network may implement one or more radio access technologies (RATs) such as CDMA2000®, wideband code division multiple access (WCDMA), and so on. CDMA2000® includes IS-95, IS-2000 and/or IS-856 standards. A TDMA network may implement global system for mobile communications (GSM), digital advanced mobile phone system (D-AMPS), or some other RAT. An OFDMA network may employ long-term evolution (LTE), LTE Advanced, fifth-generation (5G) new radio (NR), and so on. 5G NR, LTE, LTE Advanced, GSM, and WCDMA are described in documents from 3rd Generation Partnership Project (3GPP). CDMA2000® is described in documents from a consortium named "3rd Generation Partnership Project 2" (3GPP2). 3GPP and 3GPP2 documents are publicly available. A wireless local area network (WLAN) may also be an IEEE 802.11x network, and a wireless personal area network (WPAN) may be a Bluetooth network, an IEEE 802.15x, or some other type of network. The techniques described herein may also be used for any combination of WWAN, WLAN and/or WPAN.

The UE 900 can further include sensor(s) 940. Sensor(s) 940 may comprise, without limitation, one or more inertial sensors and/or other sensors (e.g., accelerometer(s), gyroscope(s), camera(s), magnetometer(s), altimeter(s), microphone(s), proximity sensor(s), light sensor(s), barometer(s), and the like), some of which may be used to obtain position-related measurements and/or other information.

Embodiments of the UE 900 may also include a Global Navigation Satellite System (GNSS) receiver 980 capable of receiving signals 984 from one or more GNSS satellites using an antenna 982 (which could be the same as antenna 932). Positioning based on GNSS signal measurement can be utilized to complement and/or incorporate the techniques described herein. The GNSS receiver 980 can extract a position of the UE 900, using conventional techniques, from GNSS satellites of a GNSS system, such as Global Positioning System (GPS), Galileo, GLONASS, Quasi-Zenith Satellite System (QZSS) over Japan, IRNSS over India, BeiDou Navigation Satellite System (BDS) over China, and/or the like. Moreover, the GNSS receiver 980 can be used with various augmentation systems (e.g., a Satellite Based Augmentation System (SBAS)) that may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

It can be noted that, although GNSS receiver 980 is illustrated in FIG. 9 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 910, DSP 920, and/or a processor within the wireless communication interface 930 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 910 or DSP 920.

The UE 900 may further include and/or be in communication with a memory 960. The memory 960 can include, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 960 of the UE 900 also can comprise software elements (not shown in FIG. 9), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 960 that are executable by the UE 900 (and/or processor(s) 910 or DSP 920 within UE 900). In some embodiments, then, such code and/or instructions can be used to configure and/or adapt a general-purpose computer (or other device) to perform one or more operations in accordance with the described methods.

FIG. 10 is a block diagram of an embodiment of a base station 1000, which can be utilized as described herein above, with respect to base stations and/or Transmission Reception Point (TRPs). It should be noted that FIG. 10 is meant only to provide a generalized illustration of various components, any or all of which may be utilized as appropriate. In some embodiments, the base station 1000 may correspond to a gNB, an ng-eNB, and/or (more generally) a TRP. In some cases, a base station 1000 may comprise multiple TRPs—e.g. with each TRP associated with a different antenna or a different antenna array of the base station 1000 (e.g., 1032). As used herein, the transmission functionality of a TRP may be performed with a transmission point (TP) and/or the reception functionality of a TRP may be performed by a reception point (RP), which may be physically separate or distinct from a TP. That said, a TRP may comprise both a TP and an RP.

The functionality performed by a base station 1000 in earlier-generation networks (e.g., 3G and 4G) may be separated into different functional components (e.g., radio units (RUs), distributed units (DUs), and central units (CUs)) and layers (e.g., L1/L2/L3) in view Open Radio Access Networks (O-RAN) and/or Virtualized Radio Access Network (V-RAN or vRAN) in 5G or later networks, which may be executed on different devices at different locations connected, for example, via fronthaul, midhaul, and backhaul connections. As referred to herein, a "base station" (or ng-eNB, gNB, etc.) may include any or all of these functional components. The functionality of these functional components may be preformed by one or more of the hardware and/or software components illustrated in FIG. 10.

The base station 1000 is shown comprising hardware elements that can be electrically coupled via a bus 1005 (or may otherwise be in communication, as appropriate). The hardware elements may include a processor(s) 1010 which can include without limitation one or more general-purpose processors, one or more special-purpose processors (such as digital signal processor (DSP) chips, graphics acceleration processors, application-specific integrated circuits (ASICs), and/or the like), and/or other processing structure or means. As shown in FIG. 10, some embodiments may have a separate DSP 1020, depending on desired functionality. Location determination and/or other determinations based on wireless communication may be provided in the processor(s) 1010 and/or wireless communication interface 1030 (discussed below), according to some embodiments. The base station 1000 also can include one or more input devices, which can include without limitation a keyboard, display, mouse, microphone, button(s), dial(s), switch(es), and/or the like; and one or more output devices, which can include without limitation a display, light emitting diode (LED), speakers, and/or the like.

The base station 1000 might also include a wireless communication interface 1030, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX device, cellular communication facilities, etc.), and/or the like, which may enable the base station 1000 to communicate as described herein. The wireless communication interface 1030 may permit data and signaling to be communicated (e.g., transmitted and received) to UEs, other base stations/TRPs (e.g., eNBs, gNBs, and ng-eNBs), and/or other network components, computer systems, and/or other electronic devices described herein. The communication can be carried out via one or more wireless communication antenna(s) 1032 that send and/or receive wireless signals 1034. According to some embodiments, one or more wireless communication antenna(s) 1032 may comprise one or more antenna arrays, which may be capable of beamforming.

The base station 1000 may also include a network interface 1080, which can include support of wireline communication technologies. The network interface 1080 may include a modem, network card, chipset, and/or the like. The network interface 1080 may include one or more input and/or output communication interfaces to permit data to be exchanged with a network, communication network servers, computer systems, and/or any other electronic devices described herein.

In many embodiments, the base station 1000 may further comprise a memory 1060. The memory 1060 can include, without limitation, local and/or network accessible storage, a disk drive, a drive array, an optical storage device, a solid-state storage device, such as a random-access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 1060 of the base station 1000 also may comprise software elements (not shown in FIG. 10), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the method(s) discussed above may be implemented as code and/or instructions in memory 1060 that are executable by the base station 1000 (and/or processor(s) 1010 or DSP 1020 within base station 1000). In some embodiments, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media and volatile media. Common forms of computer-readable media include, for example, magnetic and/or optical media, any other physical medium with patterns of holes, a RAM, a programmable ROM (PROM), erasable PROM (EPROM), a FLASH-EPROM, any other memory chip or cartridge, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussion utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the scope of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method of configuring a receiving user equipment (UE) for multi-anchor sidelink quasi-colocation (mSL-QCL) information, the method comprising: determining, at a base device, a quali-colocation (QCL) relation between a first wireless reference signal transmitted by a first sidelink (SL) anchor and a second wireless reference signal transmitted by a second SL anchor, wherein: the first SL anchor and the second SL anchor comprise UEs separate from the receiving UE, and the first wireless reference signal and the second wireless reference signal are transmitted for positioning of the receiving UE, performing radio frequency (RF) sensing, or both; and wirelessly sending, from the base device to the receiving UE, the mSL-QCL information, wherein the mSL-QCL information is indicative of the QCL relation between the first wireless reference signal and the second wireless reference signal.

Clause 2. The method of clause 1, wherein the base device comprises the first SL anchor.

Clause 3. The method of clause 2 wherein determining the QCL relation between the first wireless reference signal and the second wireless reference signal comprises communicating, by the first SL anchor via an SL link, with the second SL anchor.

Clause 4. The method of clause 1 wherein the base device comprises a base station of a wireless communication network.

Clause 5. The method of any one of clauses 1-4 wherein the first wireless reference signal, the second wireless reference signal, or both, comprise: an SL synchronization signal block (SL-SSB), an SL channel state information reference signal (SL-CSI-RS), an SL positioning reference signa (SL-PRS), a physical sidelink shared channel (PSSCH), physical sidelink control channel (PSCCH), or physical sidelink feedback channel (PSFCH), or a combination thereof.

Clause 6. The method of any one of clauses 1-5 wherein wirelessly sending the mSL-QCL information comprises including the mSL-QCL information in a Transmission Configuration Indication (TCI).

Clause 7. The method of clause 6 wherein the TCI comprises an mSL TCI in which: a TCI state specific to mSL is used, an identity of the first SL anchor is included, or an identity of a reference signal origin is included, or a combination thereof.

Clause 8. The method of any one of clauses 1-7 wherein wirelessly sending the mSL-QCL information comprises including at least a portion of the mSL-QCL information in a Radio Resource Control (RRC) message, the portion of the mSL-QCL information comprising an initial list of mSL-TCI states.

Clause 9. The method of any one of clauses 1-8 wherein wirelessly sending the mSL-QCL information comprises indicating the QCL relation between the first wireless reference signal and the second wireless reference signal via SL control information (SCI) or downlink control information (DCI).

Clause 10. A method at a receiving user equipment (UE) for utilizing multi-anchor sidelink quasi-colocation (mSL-QCL) information, the method comprising: wirelessly receiving, at the receiving UE, the mSL-QCL information from a base device, wherein the mSL-QCL information is indicative of a quali-colocation (QCL) relationship between a first wireless reference signal transmitted by a first sidelink (SL) anchor and a second wireless reference signal transmitted by a second SL anchor, and wherein: the first SL anchor and the second SL anchor comprise UEs separate from the receiving UE, and the first wireless reference signal and the second wireless reference signal are transmitted for positioning of the receiving UE, performing radio frequency (RF) sensing, or both; and wirelessly measuring the first wireless reference signal, the second wireless reference signal, or both, based at least in part on the mSL-QCL information.

Clause 11. The method of clause 10, wherein wirelessly measuring comprises refraining from measuring the first wireless reference signal or the second wireless reference signal based at least in part on the QCL relation between the first wireless reference signal and the second wireless reference signal.

Clause 12. The method of any one of clauses 10-11 wherein the base device comprises the first SL anchor or a base station of a wireless communication network.

Clause 13. The method of any one of clauses 10-12 wherein the first wireless reference signal, the second wireless reference signal, or both, comprise: an SL synchronization signal block (SL-SSB), an SL channel state information reference signal (SL-CS I-RS), an SL positioning reference signa (SL-PRS), a physical sidelink shared channel (PSSCH), physical sidelink control channel (PSCCH), or physical sidelink feedback channel (PSFCH), or a combination thereof.

Clause 14. The method of any one of clauses 10-13 wherein wirelessly receiving the mSL-QCL information comprises receiving the mSL-QCL information in a Transmission Configuration Indication (TCI).

Clause 15. The method of clause 14 wherein the TCI comprises an mSL TCI in which: a TCI state specific to mSL is used, an identity of the first SL anchor is included, or an identity of a reference signal origin is included, or a combination thereof.

Clause 16. A base device for configuring a receiving user equipment (UE) for multi-anchor sidelink quasi-colocation (mSL-QCL) information, the base device comprising: a transceiver; a memory; and one or more processors communicatively coupled with the transceiver and the memory, wherein the one or more processors are configured to: determine a quali-colocation (QCL) relation between a first wireless reference signal transmitted by a first sidelink (SL) anchor and a second wireless reference signal transmitted by a second SL anchor, wherein: the first SL anchor and the second SL anchor comprise UEs separate from the receiving UE, and the first wireless reference signal and the second wireless reference signal are transmitted for positioning of the receiving UE, performing radio frequency (RF) sensing, or both; and wirelessly send, via the transceiver to the receiving UE, the mSL-QCL information, wherein the mSL-QCL information is indicative of the QCL relation between the first wireless reference signal and the second wireless reference signal.

Clause 17. The base device of clause 16, wherein the base device comprises the first SL anchor.

Clause 18. The base device of clause 17 wherein, to determine the QCL relation between the first wireless reference signal and the second wireless reference signal, the one or more processors are configured to communicate, via an SL link using the transceiver, with the second SL anchor.

Clause 19. The base device of clause 16 wherein the base device comprises a base station of a wireless communication network.

Clause 20. The base device of any one of clauses 16-19 wherein the first wireless reference signal, the second wireless reference signal, or both, comprise: an SL synchronization signal block (SL-SSB), an SL channel state information reference signal (SL-CS I-RS), an SL positioning reference signa (SL-PRS), a physical sidelink shared channel (PSSCH), physical sidelink control channel (PSCCH), or physical sidelink feedback channel (PSFCH), or a combination thereof.

Clause 21. The base device of any one of clauses 16-20 wherein, to wirelessly send the mSL-QCL information, the one or more processors are configured to include the mSL-QCL information in a Transmission Configuration Indication (TCI).

Clause 22. The base device of clause 21 wherein, to include the mSL-QCL information in the TCI, the one or more processors are configured to send an mSL TCI in which a TCI state specific to mSL is used, an identity of the first SL anchor is included, or an identity of a reference signal origin is included, or a combination thereof.

Clause 23. The base device of any one of clauses 16-22 wherein, to wirelessly send the mSL-QCL information, the one or more processors are configured to include at least a portion of the mSL-QCL information in a Radio Resource Control (RRC) message, the portion of the mSL-QCL information comprising an initial list of mSL-TCI states.

Clause 24. The base device of any one of clauses 16-23 wherein, to wirelessly send the mSL-QCL information, the one or more processors are configured to indicate the QCL relation between the first wireless reference signal and the second wireless reference signal via SL control information (SCI) or downlink control information (DCI).

Clause 25. A receiving user equipment (UE) for utilizing multi-anchor sidelink quasi-colocation (mSL-QCL) information, the receiving UE comprising: a transceiver; a memory; and one or more processors communicatively coupled with the transceiver and the memory, wherein the one or more processors are configured to: wirelessly receive, via the transceiver, the mSL-QCL information from a base device, wherein the mSL-QCL information is indicative of a quali-colocation (QCL) relationship between a first wireless reference signal transmitted by a first sidelink (SL) anchor and a second wireless reference signal transmitted by a second SL anchor, and wherein: the first SL anchor and the second SL anchor comprise UEs separate from the receiving UE, and the first wireless reference signal and the second wireless reference signal are transmitted for positioning of the receiving UE, performing radio frequency (RF) sensing, or both; and wirelessly measure, with the transceiver, the first wireless reference signal, the second wireless reference signal, or both, based at least in part on the mSL-QCL information.

Clause 26. The receiving UE of clause 25, wherein, to wirelessly measure, the one or more processors are configured to refrain from measuring the first wireless reference signal or the second wireless reference signal based at least in part on the QCL relation between the first wireless reference signal and the second wireless reference signal.

Clause 27. The receiving UE of any one of clauses 25-26 wherein the base device comprises the first SL anchor or a base station of a wireless communication network.

Clause 28. The receiving UE of any one of clauses 25-27 wherein the first wireless reference signal, the second wireless reference signal, or both, comprise: an SL synchronization signal block (SL-SSB), an SL channel state information reference signal (SL-CS I-RS), an SL positioning reference signa (SL-PRS), a physical sidelink shared channel (PSSCH), physical sidelink control channel (PSCCH), or physical sidelink feedback channel (PSFCH), or a combination thereof.

Clause 29. The receiving UE of any one of clauses 25-28 wherein, to wirelessly receive the mSL-QCL information, the one or more processors are configured to receive the mSL-QCL information in a Transmission Configuration Indication (TCI).

Clause 30. The receiving UE of clause 29 wherein, to receive the mSL-QCL information in the TCI, the one or more processors are configured to receive an mSL TCI in which a TCI state specific to mSL is used, an identity of the first SL anchor is included, or an identity of a reference signal origin is included, or a combination thereof.

Clause 31. An apparatus having means for performing the method of any one of clauses 1-30.

Clause 32. A non-transitory computer-readable medium storing instructions, the instructions comprising code for performing the method of any one of clauses 1-30.

What is claimed is:

1. A method of configuring a receiving user equipment (UE) for multi-anchor sidelink quasi-colocation (mSL-QCL) information, the method comprising:
   determining, at a base device, a quasi-colocation (QCL) relation between a first wireless reference signal transmitted by a first sidelink (SL) anchor and a second wireless reference signal transmitted by a second SL anchor, wherein:
   the first SL anchor and the second SL anchor comprise UEs separate from the receiving UE, and
   the first wireless reference signal and the second wireless reference signal are transmitted for positioning of the receiving UE, performing radio frequency (RF) sensing, or both; and
   wirelessly sending, from the base device to the receiving UE, the mSL-QCL information associated with the first SL anchor and the second SL anchor, wherein the mSL-QCL information is indicative of the QCL relation between the first wireless reference signal transmitted by the first SL anchor and the second wireless reference signal transmitted by the second SL anchor.

2. The method of claim 1, wherein the base device comprises the first SL anchor.

3. The method of claim 2, wherein determining the QCL relation between the first wireless reference signal and the second wireless reference signal comprises communicating, by the first SL anchor via an SL link, with the second SL anchor.

4. The method of claim 1, wherein the base device comprises a base station of a wireless communication network.

5. The method of claim 1, wherein the first wireless reference signal, the second wireless reference signal, or both, comprise:
   an SL synchronization signal block (SL-SSB),
   an SL channel state information reference signal (SL-CSI-RS),
   an SL positioning reference signal (SL-PRS),
   a physical sidelink shared channel (PSSCH),
   physical sidelink control channel (PSCCH), or
   physical sidelink feedback channel (PSFCH), or
   a combination thereof.

6. The method of claim 1, wherein wirelessly sending the mSL-QCL information comprises including the mSL-QCL information in a Transmission Configuration Indication (TCI).

7. The method of claim 6, wherein the TCI comprises an mSL TCI in which:
   a TCI state specific to mSL is used,
   an identity of the first SL anchor is included, or
   an identity of a reference signal origin is included, or
   a combination thereof.

8. The method of claim 1, wherein wirelessly sending the mSL-QCL information comprises including at least a portion of the mSL-QCL information in a Radio Resource Control (RRC) message, the portion of the mSL-QCL information comprising an initial list of mSL-TCI states.

9. The method of claim 1, wherein wirelessly sending the mSL-QCL information comprises indicating the QCL relation between the first wireless reference signal and the second wireless reference signal via SL control information (SCI) or downlink control information (DCI).

10. A method at a receiving user equipment (UE) for utilizing multi-anchor sidelink quasi-colocation (mSL-QCL) information, the method comprising:
    wirelessly receiving, at the receiving UE, the mSL-QCL information associated with a first sidelink (SL) anchor and a second SL anchor from a base device, wherein the mSL-QCL information is indicative of a quasi-colocation (QCL) relationship between a first wireless reference signal transmitted by the first SL anchor and a second wireless reference signal transmitted by the second SL anchor, and wherein:
    the first SL anchor and the second SL anchor comprise UEs separate from the receiving UE, and
    the first wireless reference signal and the second wireless reference signal are transmitted for positioning of the receiving UE, performing radio frequency (RF) sensing, or both; and
    wirelessly measuring the first wireless reference signal, the second wireless reference signal, or both, based at least in part on the mSL-QCL information.

11. The method of claim 10, wherein wirelessly measuring comprises refraining from measuring the first wireless reference signal or the second wireless reference signal based at least in part on the QCL relation between the first wireless reference signal and the second wireless reference signal.

12. The method of claim 10, wherein the base device comprises the first SL anchor or a base station of a wireless communication network.

13. The method of claim 10, wherein the first wireless reference signal, the second wireless reference signal, or both, comprise:
an SL synchronization signal block (SL-SSB),
an SL channel state information reference signal (SL-CSI-RS),
an SL positioning reference signal (SL-PRS),
a physical sidelink shared channel (PSSCH),
physical sidelink control channel (PSCCH), or
physical sidelink feedback channel (PSFCH), or
a combination thereof.

14. The method of claim 10, wherein wirelessly receiving the mSL-QCL information comprises receiving the mSL-QCL information in a Transmission Configuration Indication (TCI).

15. The method of claim 14, wherein the TCI comprises an mSL TCI in which:
a TCI state specific to mSL is used,
an identity of the first SL anchor is included, or
an identity of a reference signal origin is included, or
a combination thereof.

16. A base device for configuring a receiving user equipment (UE) for multi-anchor sidelink quasi-colocation (mSL-QCL) information, the base device comprising:
a transceiver;
a memory; and
one or more processors communicatively coupled with the transceiver and the memory, wherein the one or more processors are configured to:
determine a quasi-colocation (QCL) relation between a first wireless reference signal transmitted by a first sidelink (SL) anchor and a second wireless reference signal transmitted by a second SL anchor, wherein:
the first SL anchor and the second SL anchor comprise UEs separate from the receiving UE, and
the first wireless reference signal and the second wireless reference signal are transmitted for positioning of the receiving UE, performing radio frequency (RF) sensing, or both; and
wirelessly send, via the transceiver to the receiving UE, the mSL-QCL information associated with the first SL anchor and the second SL anchor, wherein the mSL-QCL information is indicative of the QCL relation between the first wireless reference signal transmitted by the first SL anchor and the second wireless reference signal transmitted by the second SL anchor.

17. The base device of claim 16, wherein the base device comprises the first SL anchor.

18. The base device of claim 17, wherein, to determine the QCL relation between the first wireless reference signal and the second wireless reference signal, the one or more processors are configured to communicate, via an SL link using the transceiver, with the second SL anchor.

19. The base device of claim 16, wherein the base device comprises a base station of a wireless communication network.

20. The base device of claim 16, wherein the first wireless reference signal, the second wireless reference signal, or both, comprise:
an SL synchronization signal block (SL-SSB),
an SL channel state information reference signal (SL-CSI-RS),
an SL positioning reference signal (SL-PRS),
a physical sidelink shared channel (PSSCH),
physical sidelink control channel (PSCCH), or
physical sidelink feedback channel (PSFCH), or
a combination thereof.

21. The base device of claim 16, wherein, to wirelessly send the mSL-QCL information, the one or more processors are configured to include the mSL-QCL information in a Transmission Configuration Indication (TCI).

22. The base device of claim 21, wherein, to include the mSL-QCL information in the TCI, the one or more processors are configured to send an mSL TCI in which:
a TCI state specific to mSL is used,
an identity of the first SL anchor is included, or
an identity of a reference signal origin is included, or
a combination thereof.

23. The base device of claim 16, wherein, to wirelessly send the mSL-QCL information, the one or more processors are configured to include at least a portion of the mSL-QCL information in a Radio Resource Control (RRC) message, the portion of the mSL-QCL information comprising an initial list of mSL-TCI states.

24. The base device of claim 16, wherein, to wirelessly send the mSL-QCL information, the one or more processors are configured to indicate the QCL relation between the first wireless reference signal and the second wireless reference signal via SL control information (SCI) or downlink control information (DCI).

25. A receiving user equipment (UE) for utilizing multi-anchor sidelink quasi-colocation (mSL-QCL) information, the receiving UE comprising:
a transceiver;
a memory; and
one or more processors communicatively coupled with the transceiver and the memory, wherein the one or more processors are configured to:
wirelessly receive, via the transceiver, the mSL-QCL information associated with a first sidelink (SL) anchor and a second SL anchor from a base device, wherein the mSL-QCL information is indicative of a quasi-colocation (QCL) relationship between a first wireless reference signal transmitted by the first SL anchor and a second wireless reference signal transmitted by the second SL anchor, and wherein:
the first SL anchor and the second SL anchor comprise UEs separate from the receiving UE, and
the first wireless reference signal and the second wireless reference signal are transmitted for positioning of the receiving UE, performing radio frequency (RF) sensing, or both; and
wirelessly measure, with the transceiver, the first wireless reference signal, the second wireless reference signal, or both, based at least in part on the mSL-QCL information.

26. The receiving UE of claim 25, wherein, to wirelessly measure, the one or more processors are configured to refrain from measuring the first wireless reference signal or the second wireless reference signal based at least in part on the QCL relation between the first wireless reference signal and the second wireless reference signal.

27. The receiving UE of claim 25, wherein the base device comprises the first SL anchor or a base station of a wireless communication network.

28. The receiving UE of claim 25, wherein the first wireless reference signal, the second wireless reference signal, or both, comprise:
an SL synchronization signal block (SL-SSB), an SL channel state information reference signal (SL-CSI-RS),
an SL positioning reference signal (SL-PRS),
a physical sidelink shared channel (PSSCH),
physical sidelink control channel (PSCCH), or
physical sidelink feedback channel (PSFCH), or
a combination thereof.

29. The receiving UE of claim 25, wherein, to wirelessly receive the mSL-QCL information, the one or more processors are configured to receive the mSL-QCL information in a Transmission Configuration Indication (TCI).

30. The receiving UE of claim 29, wherein, to receive the mSL-QCL information in the TCI, the one or more processors are configured to receive an mSL TCI in which:
   a TCI state specific to mSL is used,
   an identity of the first SL anchor is included, or
   an identity of a reference signal origin is included, or
   a combination thereof.

* * * * *